United States Patent
Dey et al.

[11] Patent Number: 6,105,139
[45] Date of Patent: Aug. 15, 2000

[54] CONTROLLER-BASED POWER MANAGEMENT FOR LOW-POWER SEQUENTIAL CIRCUITS

[75] Inventors: Sujit Dey, San Diego, Calif.; Anand Raghunathan, Plainsboro; Niraj K. Jha, Princeton, both of N.J.

[73] Assignee: NEC USA, Inc., Princeton, N.J.

[21] Appl. No.: 09/089,392

[22] Filed: Jun. 3, 1998

[51] Int. Cl.$^7$ .............................. G06F 1/32; G06F 17/50
[52] U.S. Cl. .......................... 713/300; 713/320; 713/321
[58] Field of Search .................................. 710/300, 320, 710/323, 324, 321; 714/37, 38; 377/16; 326/39; 327/100, 143; 307/42, 409, 126; 702/60

[56] References Cited

U.S. PATENT DOCUMENTS 5,298,803  3/1994  Starkweather .
5,331,227  7/1994  Hawes .
5,461,345  10/1995  Taki .
5,784,627  7/1998  MacDonald .

OTHER PUBLICATIONS

Anthony Correale, Jr., "Overview of the Power Minimization Techniques Employed in the IBM PowerPC 4xx Embedded Controllers," International Symposium on Low Power Design, 1995.
B. Suessmigh and G. Paap, Abstract "Power PC 603 Microprocessor. Power Management," ACM 1994.
V. Tiwari et al, "Dynamic Power Management for Microprocessors: A Case Study," VLSI Design, 1997.
L. Benini et al., "Saving Power by Snythesizing Gated Clocks for Sequential Circuits," IEEE 1994.
G. E. Tellez, et al., "Activity–Driven Clock Design for Low Power Circuits," IEEE 1995.
C. Papachristou, et al, "An Effective Power Management Scheme for RTL Design Based on Multiple Clocks," IEEE 1996.
M. Alidina, et al., "Precomputation–Based Sequential Logic Optimization for Low Power," IEEE 1994.
V. Tiwari, et al., "Guarded Evaluation: Pushing Power Management to Logic Synthesis/Design," 1995.
E. Musoll and J. Cortadella, "High–Level Synthesis Techniques foir Reducing the Activity of Functional Units," IEEE 1995.
J. Monteiro, et al., "Scheduling Techniques to Enable Power Management," IEEE 1996.
A. Raghunathan, et al., "Glitch Analysis and Reduction in Register transrer Level Power Optimization," IEEE 1996.
A. Raghunathan and N. K. Jha, "Behavioral Synthesis for Low Power," IEEE 1994.

(List continued on next page.)

Primary Examiner—Gopal C. Ray
Attorney, Agent, or Firm—Sughrue, Mion, Zinn, Macpeak & Seas, PLLC

[57] ABSTRACT

A low-overhead controller-based power management technique that re-specifies control signals to reconfigure existing multiplexer networks and functional units to minimize unnecessary activity. Though the control signals in an RT-level implementation are fully specified, they can be re-specified under certain states/conditions when the data path components that they control need not be active. Another aspect of this invention is an algorithm to perform power management through controller re-specification, that consist of constructing an activity graph for each data path component, identifying conditions under which the component need not be active, and re-labeling the activity graph resulting in re-specification of the corresponding control expressions. The algorithm avoids the above negative effects of controller re-specification. Experimental results demonstrate that (i) controller re-specification allows us to perform efficient power management and obtain large power savings for control-flow intensive designs, which pose several challenges to conventional power management techniques, and (ii) it is important to consider the various potential negative effects while performing controller re-specification in order to obtain maximal power savings.

25 Claims, 20 Drawing Sheets

OTHER PUBLICATIONS

A. Raghunathan, et al., "Controller Re–Specification to Minimize Switching Activity in Controller/Data Path Circuits," IEEE 1996.

R. A. Bergamaschi et al., "Control Optimization in High–level Synthesis Using Behavioral Don't Cares," IEEE 1992.

S. C. Huang and W. H. Wolf, "Performance–Driven Synthesis in Controller–Datapath," IEEE 1994.

A. Raghunathan, et al., "Register–Transfer Level Estimation Techniques for Switching Activity and Power Consumption," IEEE 1996.

S. Bhattacharya, et al., "Clock Period Optimization During Resource Sharing and Assignment," ACM/IEEE 1994.

S. Bhattacharya et al., "Provably Correct High–Level Timing Analysis Without Path Sensitization," IEEE/ACM 1994.

S. Malik, "Analysis of Cyclic Combinational Circuits," IEEE 1994.

L. Stok, "False Loops Through Resource Sharing (Log CAD)," IEEE 1992.

S. Bhattacharya, et al., "Performance Analysis and Optimization of Schedules for Conditional and Loop–Intensive Specifications," IEEE 1994.

FIG. 7A
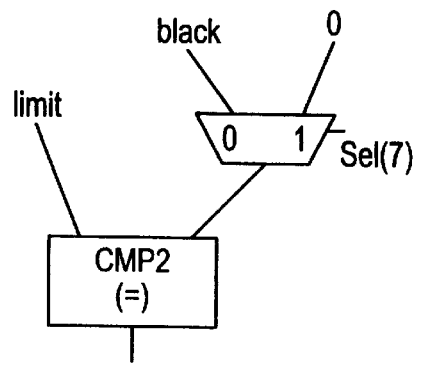
Original: Sel(7) = x4
Respecified: Self(7) = x3.c20 + x4
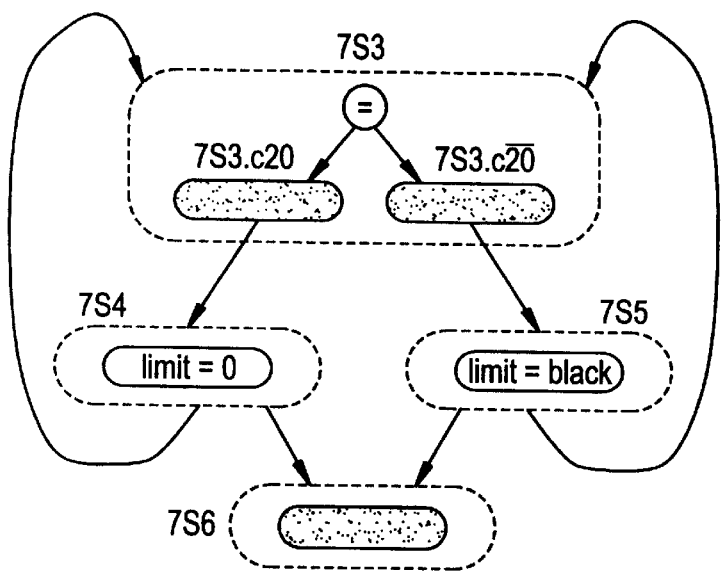
FIG. 7B
FIG. 7C
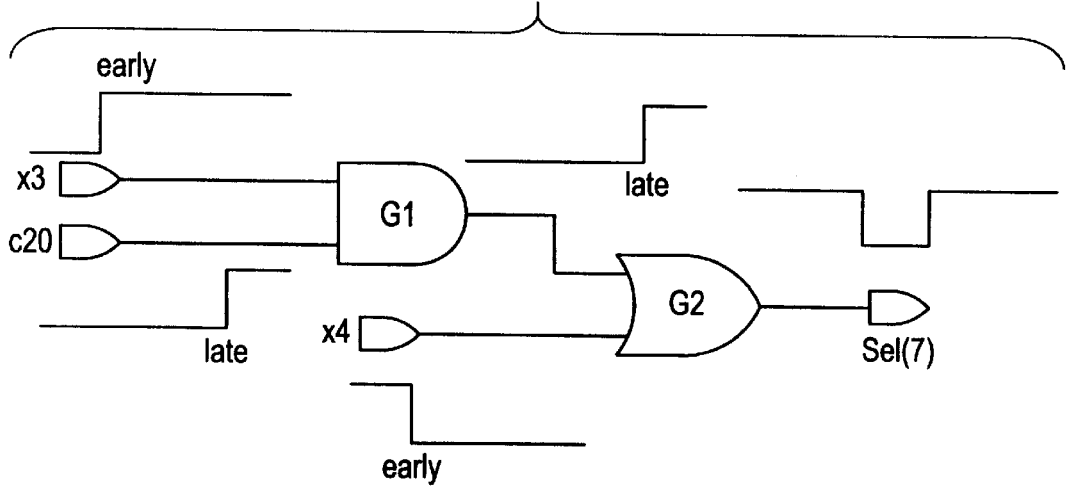

| value at c11 | # of occurences | |
|---|---|---|
| 8S2 → 8S3 | Original | Re-spec. |
| 0 → 0 | 10 | 2 |
| 0 → 1 | 25 | 0 |
| 1 → 0 | 0 | 8 |
| 1 → 1 | 2 | 27 |

$Sel(45) = x3.c8 + x3.\overline{c8}.32$
Activity at M45: 796.5/126.5

$Sel(45) = \overline{(x3.\overline{c8}.\overline{c32} + x5)}$
Activity at M45: 445.5 / 143.5

FIG. 12

```
Procedure CFI_POWER_MANAGEMENT(RTL cct. R)
{
    IDENTIFY_RTL_BLOCKS(R);
    DDG ← CREATE_DATA_DEPENDENCE_GRAPH(R);
    CDG ← CREATE_CONTROL_DEPENDENCE_GRAPH(R);
    Ordered_list ← ORDER_VERTICES (R, DDG, CDG);
    for each vertex V in ordered_list {
        U ← V.RTL_unit;
        RESPEC_CONTROL_SIGNALS(R, U)
        for each multiplexer tree M feeding U {
            RESPEC_CONTROL_SIGNALS(R, M.root)
        }
    }
}
PROCEDURE_RESPEC_CONTROL_SIGNALS(RTL cct. R, RTL cct. node N)
{
    AG ← CREATE_ACTIVITY_GRAPH(R, N)
    AG ← MERGE_SUBSTATES(R, N, AG);
    AG ← MARK_CLITCHY_DAT_INPUTS(R, N, AG);
    while (unlabeled vertices exist in AG) {
        AG ← MIN_COST_LABELING(R, N, AG);
        AG ← SELECTIVELY_UNDO_LABELS_FOR_GLITCHING(R, N, AG);
    }
    if N.node_type ==multiplexer {
        RESPEC_CONTROL_SIGNALS(R, N.left_predecessor)
        RESPEC_CONTROL_SIGNALS(R, N.right_predecessor)
    }
}
PROCEDURE MERGE_SUBSTATES(RTL cct. R, RTL cct. node N, activity graph AG)
{
    for each controller state S {
        for each pair of sub-states ($S_i$, $S_j$) of state S in AG {
            if (both $S_i$ and $S_j$ are not idle states) continue;
            Assume that $S_i$ and $S_j$ will be labeled differently;
            R' ← ADD_CONTROL_DEPENDENCIES(R, $S_i$, $S_j$);
            if (DETECT_COMB_CYCLE(R') == True) Merge $S_i$ and $S_j$ in AG;
            if (DELAY_EST(R') > Clk. Period) Merge $S_i$ and $S_j$ in AG;
        }
    }
}
```

CONTROLLER-BASED POWER MANAGEMENT FOR LOW-POWER SEQUENTIAL CIRCUITS

I. BACKGROUND OF THE INVENTION

IA. Field of the Invention

This invention relates to reduction of power consumption for sequential circuits. Specifically, this invention relates to a system and method for reducing power consumption. This invention is embodied in a controller-based power management system, in a method for managing power consumption in a sequential circuit and in a computer product that enables a computer to perform according to the method.

IB. Related Work

Power consumption in CMOS circuits is dominated by the dynamic component that is incurred whenever signals in such circuits undergo logic transitions. However, in practice it is found that some large portions of such logic transitions that occur in a circuit are unnecessary. These unnecessary logic transitions do not affect the value generated at the circuit output. As a result, all parts of a circuit need not function in each clock cycle.

Several conventional techniques have been used to reduce power consumption in a circuit by eliminating unnecessary logic transitions at various signals within the circuit. The term "power management" is collectively used to refer to these techniques.

Conventional techniques called sequential circuit power management techniques have been applied for designing circuits at the logic and also architecture levels. Some of these techniques either involve gating clocks or preventing flip-flops/registers from being loaded to save power consumption. In such techniques, savings occur in the clock tree as well as the logic fed by the flip-flops.

Another class of techniques is called combinational circuit power management. Here again, the technique is applied at the logic and architecture levels. Combinational techniques identify idle parts of a circuit called "sub-circuits under power management" (SUPs) within the same clock cycle and shut them down.

Most modern microprocessors and microcontrollers that target portable applications employ the strategy of gating the clock input to registers in a circuit / non-overlapping clocks has been used conventionally to reduce power consumption. See C. Papachristou, M. Spining, and M. Nourani, "An effective Power Management Scheme for RTL Design Based on Multiple Clocks," in *Proc. Design Automation Conf.*, pp. 337–342, June 1996.

In another power optimization technique the output of a logic block is precomputed one or more cycles in advance. The output of a logic block, and the precomputed information is used to disable registers at the input of the blocks being loaded in future cycles. See M. Aldina, J. Monteiro, S. Devadas, A. Ghosh, and M. Papaefthymiou, "Precomputation-Based Sequential Logic Optimization for Low Power," in *IEEE Trans. VLSI Systems*, vol. 2, pp. 426–436, December 1994.

Conventionally designers have also used the idea of avoiding unnecessary transitions to logic blocks whose inputs are not fed by registers, by inserting "signal barriers" such as pass transistors or transparent latches. See M. Aldina, J. Monteiro, S. Devadas, A. Ghosh, and M. Papaefthymiou, "Precomputation-Based Sequential Logic Optimization for Low Power," in *IEEE Trans. VLSI Systems*, vol. 2, pp. 426–436, December 1994 and V. Tiwari, S. Malik, and P. Ashar, "Guarded Evaluation: Pushing Power Management to Logic Synthesis/Design," in *Proc. Int. Symp. Low Power Design*, pp. 221–226, April 1995 and A. Correale Jr., "Overview of the Power Minimization Techniques Employed in the IBM PowerPC 4xx Embedded Processors," in *Proc. Int. Symp. Low Power Design*, pp. 75–80, April 1995.

Yet another technique suggested in literature is an automated technique called guarded evaluation. Here, parts of a circuit that can be isolated or shut off for each cycle is determined. See V. Tiwari, S. Malik, and P. Ashar, "Guarded Evaluation: Pushing Power Management to Logic Synthesis/Design," in *Proc. Int. Symp. Low Power Design*, pp. 221–226, April 1995.

The notion of operand isolation has also been integrated into high-level synthesis. Here, transparent latches are inserted at the inputs of each functional unit in order to freeze the previous cycle's values in control steps of the schedule where the functional unit is unused. See E. Musoll and J. Cortadella, "High-Level Synthesis Techniques for Reducing the Activity of Functional Units," in *Proc. Int. Symp. Low Power Design*, pp. 99–104, April 1995.

An approach to perform scheduling during high-level synthesis to maximize the opportunities for pre-computation was presented in J. Monteiro, P. Ashar, and S. Devadas, "Scheduling Techniques to Enable Power Management," in *Proc. Design Automation Conf*, pp. 349–352, June 1996. Software and firmware-controlled power management are already a commercial practice as suggested by products such as Fujitsu's SPARClite microprocessor, and Phoenix Technologies NoteBIOS 4.0.

The evolution of high-level design techniques where the above-mentioned power management techniques have been used has often been driven by specific application domains, such as data-flow or control-flow. Data-flow is often an arithmetic intensive domain that includes digital signal processing, image processing, graphics, and several multimedia applications. However, control-flow is often a decision intensive application domain, that includes networking/telecommunication protocols, embedded controllers, etc.

The behavioral descriptions of data-flow intensive designs are dominated by arithmetic operations such as addition, subtraction, and multiplication. On the other hand, the behavioral descriptions of control-flow intensive designs are dominated by nested conditional constructs, data-dependent loops, and comparisons, with very few arithmetic operations.

Area, delay, and power of structural RTL implementations of data-flow intensive designs are dominated by arithmetic units and registers in the data path. On the other hand, area, delay and power of control-flow intensive designs are dominated by non-arithmetic units like multiplexers, bit-manipulation units, and comparators.

A large number of designs, in practice, are control-flow intensive. A substantial number of designs contain a significant mix of control and data flow.

Control-flow intensive designs have several characteristics that pose challenges to conventional power management techniques:

Power consumption is dominated by an abundance of smaller components like multiplexers, while functional units may account only for a small part of the total power. See A. Raghunathan, S. Dey, and N. K. Jha, "Glitch Analysis and Reduction in Register-Transfer-Level Power Optimization," in *Proc. Design Automation Conf*, pp. 331–336, June 1996. In such circuits addition to power overheads due to the insertion of transparent latches is comparable to power savings obtained when power management is applied to sub-circuits such as multiplexer networks.

Signals that detect idle conditions for various sub-circuits are typically late-arriving (for example, due to the presence of nested conditionals within each controller state, the idle conditions may depend on outputs of comparators from the data path). As a result, timing constraints that must be imposed to apply conventional power management techniques are often not met because the "enable" signal to the transparent latches must settle before its data inputs can change.

The presence of significant glitching activity at control as well as data path signals needs to be accounted for in order to obtain maximal power savings. See A. Raghunathan, S. Dey, and N. K. Jha, "Glitch Analysis and Reduction in Register-Transfer-Level Power Optimization," in *Proc. Design Automation Conf*, pp. 331–336, June 1996.

These problems reveal that conventional power management techniques may often not be suited to control-flow intensive designs. On the other hand, they cause negative effects like circuit delay, glitching activity at control and data path signals, and formation of false combinational cycles.

Though several techniques have been used in conventional systems as noted above, significant reductions in power consumption in data-flow and control-flow still needs to be achieved. Power consumption should be reduced further to realize the potential offered by sequential circuits in the design of products used daily. For example, reductions in power consumption are required for further miniaturization of appliances like personal computers, remote control devices, etc.

The following problems, at least, exist in conventional sequential circuit design techniques:

A significant amount of power consumed in sequential circuits is unnecessary.

Conventional techniques do not achieve as much power reduction as can be achieved with the current state of technology.

Conventional power management techniques cause circuit delay.

Conventional power management techniques cause glitching activity at control and data path signals.

Conventional power management techniques cause formation of false combinational cycles.

Conventional power management techniques may not be suited for control-flow intensive designs.

II. SUMMARY OF THE INVENTION

It is an objective of this invention to solve the problems of identifying and reducing unnecessary power consumption of sequential circuits including data-flow and control-flow circuits without causing the negative effects seen in conventional techniques.

Specifically it is an object of this invention to do power management for components in the data path of a sequential circuit using controller respecification.

It is another object of this invention to extend controller re-specification methodology to control-flow intensive designs that may contain several conditional paths within each controller state.

It is yet another object of this invention to provide techniques to avoid negative effects of controller re-specification—an increase in the glitching activity at signals in the circuit, increase in circuit delay, and the formation of false combinational loops.

Yet another objective of this invention is to propose an algorithm for performing power management through controller re-specification.

To achieve the objects of the invention it is provided a controller based power management system for sequential circuits comprising a circuit input unit, an RTL circuit structure analyzer, a controller redesign unit and a circuit output unit, wherein the circuit input unit receives a sequential circuit, wherein the RTL circuit structure analyzer analyzes the received circuit for controller re-specification and wherein the controller redesign unit redesigns the circuit using controller re-specification by changing the control logic to reduce power consumption.

Further improvements include the redesign unit comprising an RTL enumerator, an activity graph generator, an activity graph relabeler and a controller logic reflector, wherein the RTL unit enumerator enumerates RTL units in the received circuit, wherein the activity graph generator generates an activity graph of the RTL units and wherein the activity graph relabeler relabels the activity graph.

Still further improvements include the RTL circuit structural analyzer comprising an RTL block identifier, a data dependency graph extractor, a control dependency graph extractor and an RTL block sorter, wherein the RTL block identifier identifies RTL blocks in the received circuit, wherein the data dependency graph extractor extracts a data dependency graph of the received circuit, and wherein the control dependency graph extractor extracts a control dependency graph of the received circuit and wherein the RTL block sorter orders the identified RTL blocks using information from the data dependency graph and the control dependency graph.

Still further improvements include the controller redesign unit further comprising a delay estimator, a combinational loop checker and a switching activity estimator, wherein the delay estimator estimates delays introduced in a redesigned circuit, wherein the combinational loop checker identifies combinational loops in the redesigned circuit, and wherein the switching activity estimator estimates all the switching activity in the redesigned circuit.

Another aspect of this invention is a method for changing control logic of a sequential circuit to reduce power consumption, wherein said method does not affect data logic of the sequential circuit other than a significant reduction to power in data logic.

Yet another aspect of this invention is a method for changing control logic for a sequential circuit, said method comprising: creating an activity graph of the sequential circuit, identifying idle states in the activity graph, changing control logic by relabeling the idle states to form relabelled idle states, and redesigning control logic using the relabelled idle states.

Further improvements include a method of creating an activity graph comprising identifying states with nested conditional operations, splitting the states into a plurality of substates wherein each of said plurality of substates corresponds to a mutually exclusive conditional path and creating a vertex in the activity graph for each substate.

Further improvements include a method of relabelling idle states to prevent glitches by relabeling states and substates, identifying states and substates where glitches occur, and rejecting relabeling for states and substates where glitches occur.

In a further improvement, transition fan-outs to a circuit component in the sequential circuit are identified and re-specified before re-specifying said component. In another improvement states and substates in which arithmetic logic unit outputs are known to be glitchy are not selected for relabelling.

In yet another improvement, substates leading to increase in delay at re-specified control signals are identified and merged into a single vertex.

In a further improvement a high level delay estimation tool is used to estimate the delay.

In a further improvement relabelling step further comprises identifying pairs of substates within a state wherein at least one member of said pairs is idle, identifying additional dependencies that could be introduced in the circuit if the identified pairs of substates are relabeled, performing a linear time traversal of the circuit to determine if a combinational cycle is introduced and merging the pairs of substates into a single vertex in the activity graph if a combinational cycle is introduced.

Yet another aspect of this invention is a method of power management through control re-specification, said method comprising breaking a data path of a sequential circuit into RTL blocks, creating one or more dependency graphs; changing the order in which to select said RTL blocks for re-specification to create an ordered list using the dependency graphs, selecting next unre-specified RTL unit in the ordered list, re-specifying each multiplexor tree feeding the RTL unit selected repeating the steps for all RTL units in the ordered list. In preferred embodiments the dependency graphs are data dependency graph and control dependency graph.

In a further improvement re-specifying is performed using the steps of: creating an activity graph, merging substates in the activity graph, marking glitchy data inputs, applying minimum cost labeling to the activity graph, undoing labeling for glitchy labels in the activity graph, repeating the steps for unlabeled vertices, recursively re-specifying a left predecessor multiplexor tree and recursively re-specifying a right predecessor multiplexer tree.

A further improvement includes a method of merging substates comprising: selecting a state, identifying a pair of substates for the state, determining if at least one substate from the pair of substates is idle, merging the substates if they it is idle and if cycles are detected or if estimated delay is greater than cycle period, and repeating the steps for all pairs of substates in the state and repeating the steps for all states.

Yet further improvements include a method for relabelling comprising identifying next unlabeled vertex in the activity graph according to a preselected criterion, labeling unlabeled vertices so that incremental cost is minimized using the formula:

$$\mathrm{Incrl\_Labeling\,Cost}(V^*, L^*) = \sum_{\text{all } V_i \to V^* \text{ s.t. } V_i \text{ is labeled}} AM_{V_i \to V^*}[L_i, L^*] \cdot W_{V_i \to V^*} + \sum_{\text{all } V^* \to V_j \text{ s.t. } V_j \text{ is labeled}} AM_{V^* \to V_j}[L^*, L_j] \cdot W_{V \to V_j}$$

and repeating the step for each unlabeled vertex.

Further improvements include a method for identifying a next unlabeled vertex comprising:

identifying all transitions from all labeled vertices to $V^*$, assigning cost of transition for all vertices identified in the previous step, adding costs of all transition to form a first sum, adding cost of all transitions in the previous step to form a second sum, adding the first and the second sum and repeating all the previous steps for all unlabeled vertices $V^*$ and choosing an unlabelled vertex $V^*$ such that the final cost is maximum.

Another aspect of the present invention is a computer program product for a controller based power management system for sequential circuits comprising a circuit input unit, an RTL circuit structure analyzer, a controller redesign unit, and a circuit output unit, the computer program product including a computer readable medium comprising a circuit input unit code, an RTL circuit structure analyzer code, a controller redesign unit code and a circuit output unit. The circuit input unit code enables a computer to receive a sequential circuit. The RTL circuit structure analyzer code enables a computer to analyze the sequential circuit for controller re-specification. The controller redesign unit code enables a computer to redesign the circuit using controller re-specification by changing only the control logic to reduce power consumption.

Further improvements include the controller redesign unit code comprising an RTL unit enumerator code, an activity graph generator code, an activity graph relabeler code and a controller logic reflector code. The RTL unit enumerator code enables a computer to enumerates RTL units in the sequential circuit. The activity graph regenerator code enables a computer to generate an activity graph of the RTL units. The activity graph relabeler code enables a computer to relabel the activity graph.

Still further improvements include the RTL circuit structural analyzer code comprising an RTL block identifier code, a data dependency graph extractor code, a control dependency graph extractor code; and an RTL block sorter code. The RTL block identifier code enables a computer to identify RTL blocks in the sequential circuit. The data dependency graph extractor code enables a computer to extract a data dependency graph of the sequential circuit. The control dependency graph extractor code enables a computer to extract a control dependency graph of the sequential circuit and the RTL block sorter code enables a computer to sort the RTL blocks.

Still further improvements include the controller redesign unit code further comprising a delay estimator code, a combinational loop checker code and a switching activity estimator code. The delay estimator code enables a computer to estimates delays introduced in a redesigned circuit. The combinational loop checker code enables a computer to identify combinational loops in the redesigned circuit and the switching activity estimator code enables a computer to estimate all the switching activity in the redesigned circuit.

III. BRIEF DESCRIPTION OF DRAWINGS

The above objects and advantages of the present invention will become more apparent by describing in detail preferred embodiments thereof with reference to the attached drawings in which.

Figure 4A:
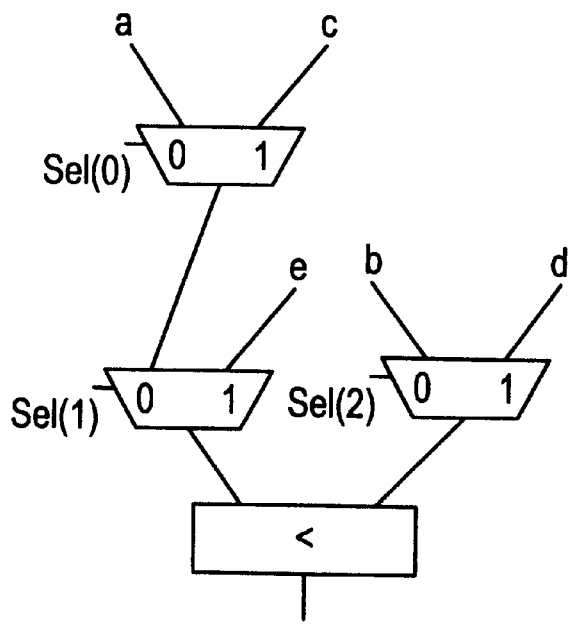
Figure 4B:
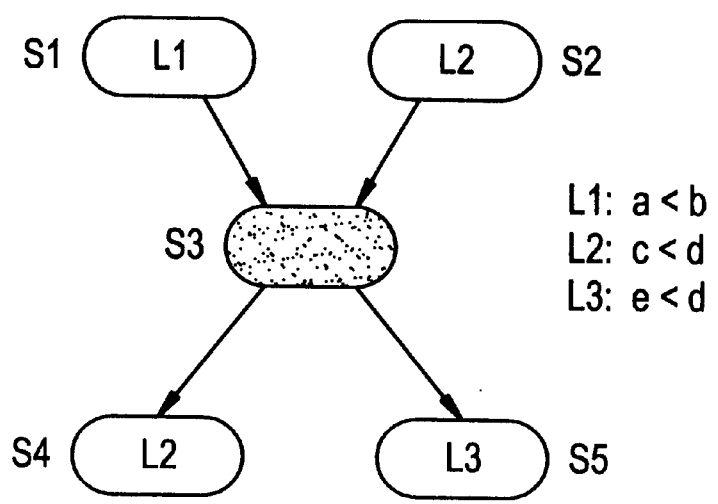

FIGS. 4(a)–(b) show a less-than (<) comparator that is part of the data path in an RTL circuit and its partial activity graph.

Figure 5A:
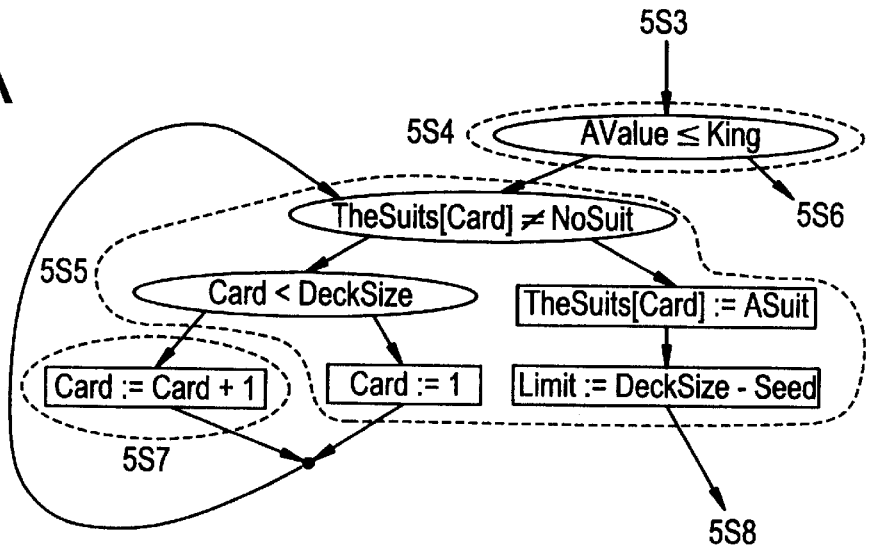

FIG. 5(a) shows part of the scheduled behavioral specification for a dealer process.

Figure 5B:
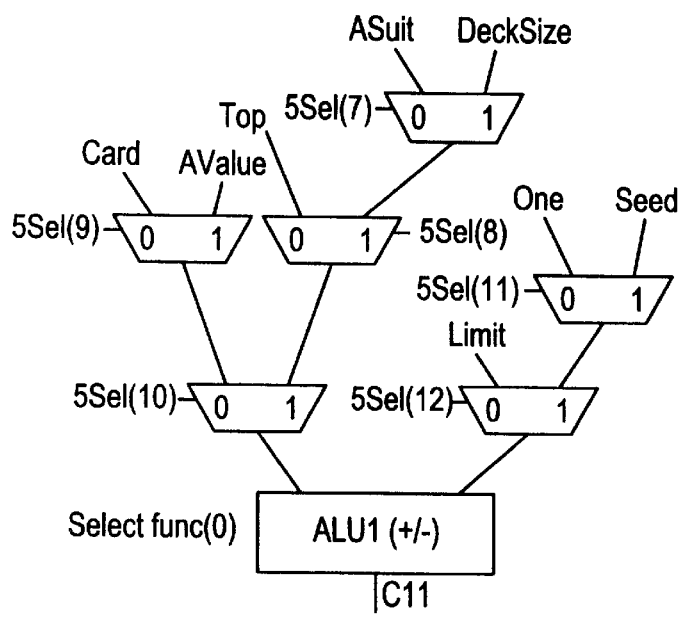

FIG. 5(b) shows ALU and multiplexers from the RTL implementation of the dealer process in FIG. 5(a).

Figure 5C:
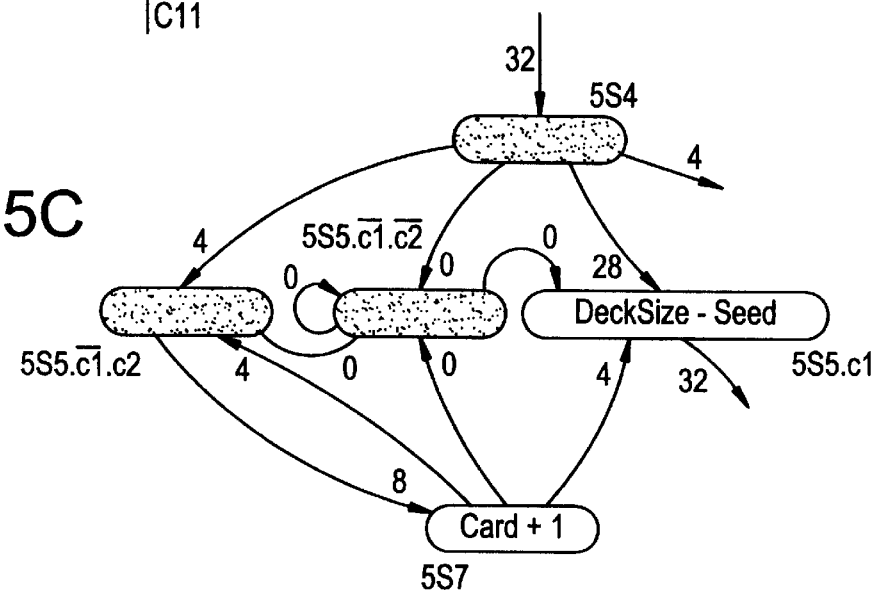

FIG. 5(c) shows a partial activity graph for the ALU of FIG. 5(b).

Figure 6B:
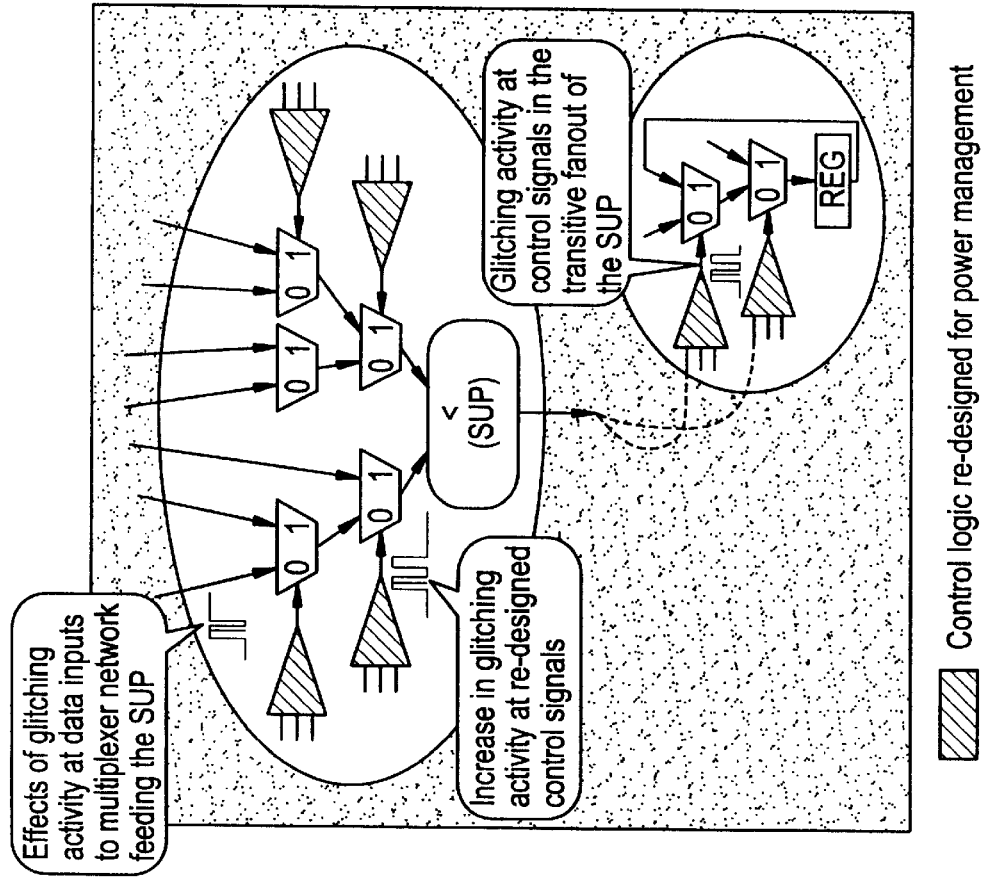
Figure 6A:
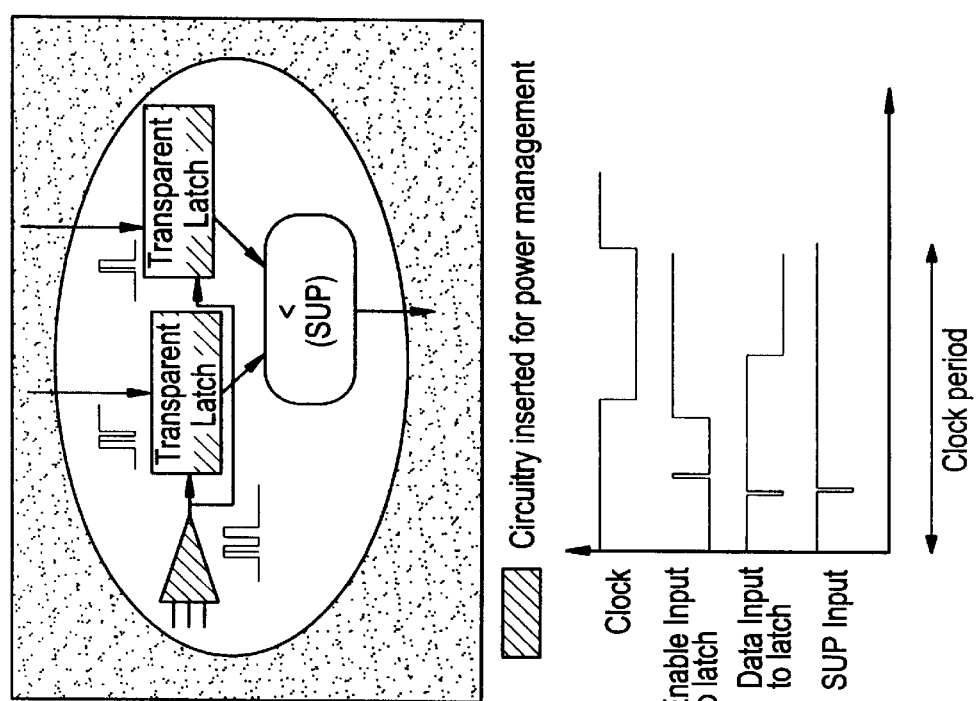

FIG. 6(a) shows glitching activity for power management based on inserting transparent latches.

FIG. 6(b) shows glitching activity for power management based on controller re-specification.

FIG. 7(a) shows a comparator C M P2 in the Barcode data path.

FIG. 7(b) shows partial activity graph for C M P2.

FIG. 7(c) shows control logic that generates signal Sel(7) and illustrates formation of glitches at the control signal that feeds C M P2.

Figure 8A:
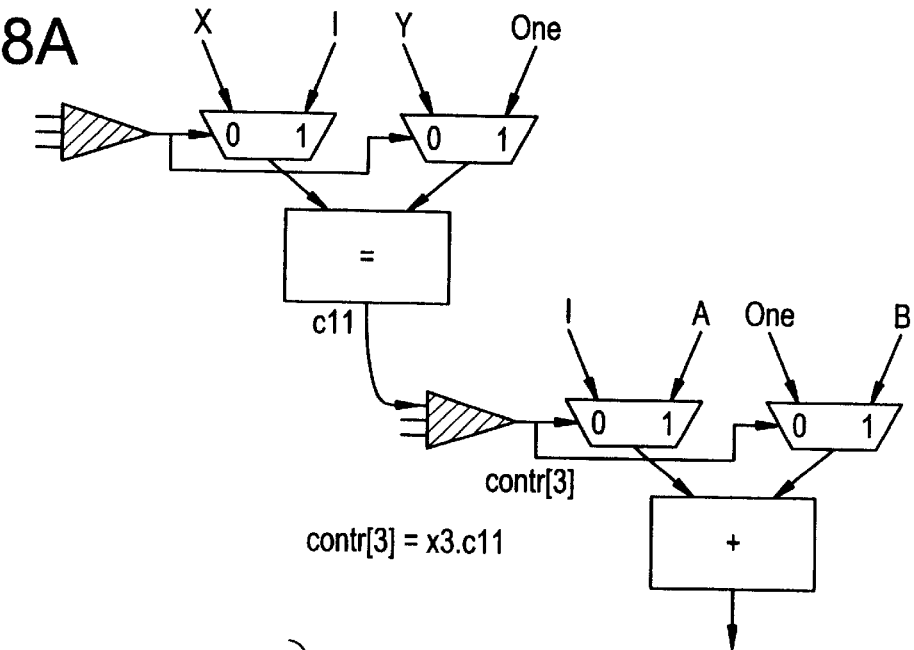

FIG. 8(a) shows a partial RTL circuit consisting of an (=) comparator feeding an ALU.

Figure 8B:
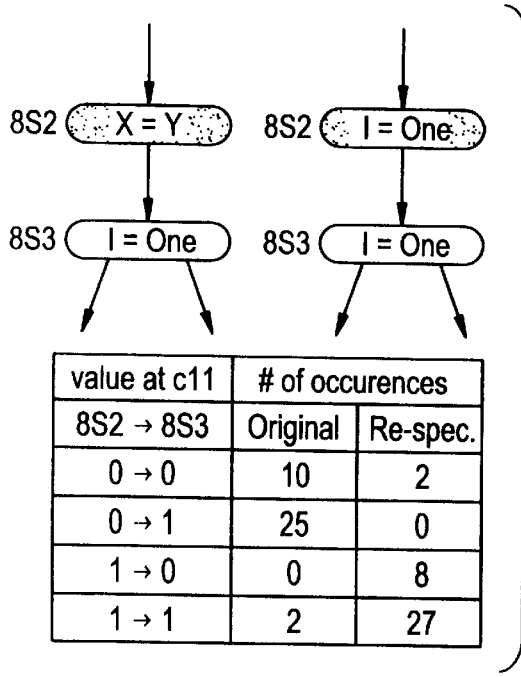

FIG. 8(b) shows the original and re-labeled activity graphs for the comparator and signal statistics at the comparator output of FIG. 8(a).

Figure 8C:
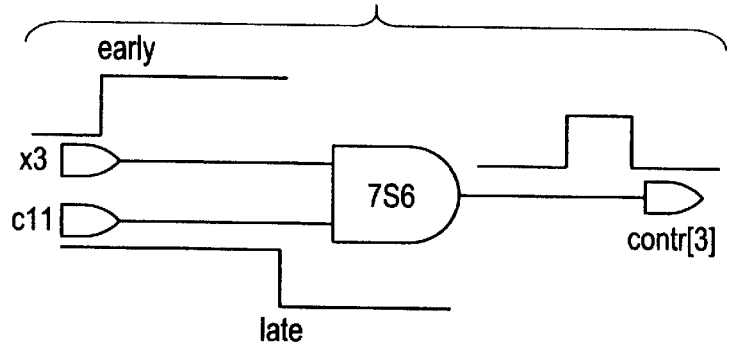

FIG. 8(c) shows generation of glitches at control signal.

Figure 9A:
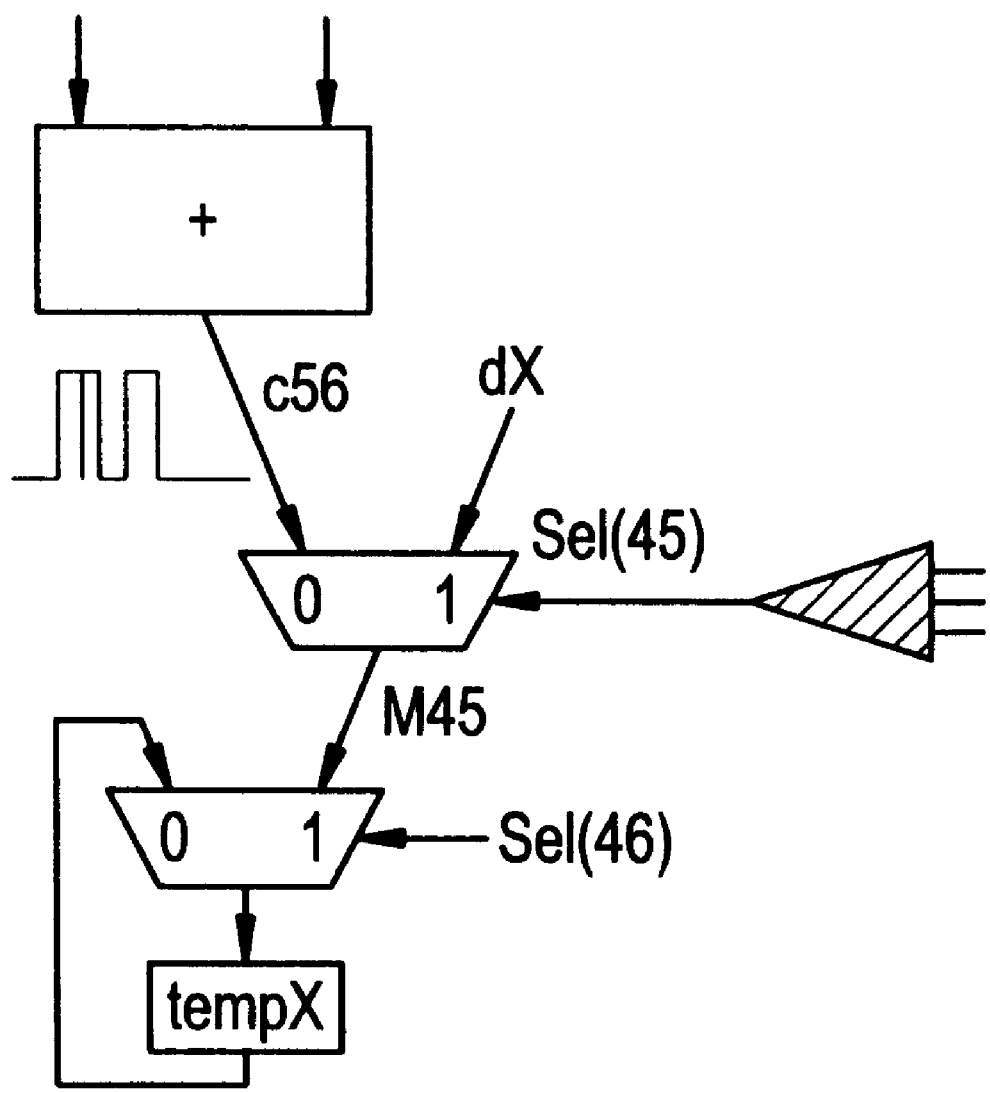

FIG. 9(a) shows controller re-specification and glitch propagation from data signals for the multiplexer tree that is part of the PixelGen data path.

Figure 9B:
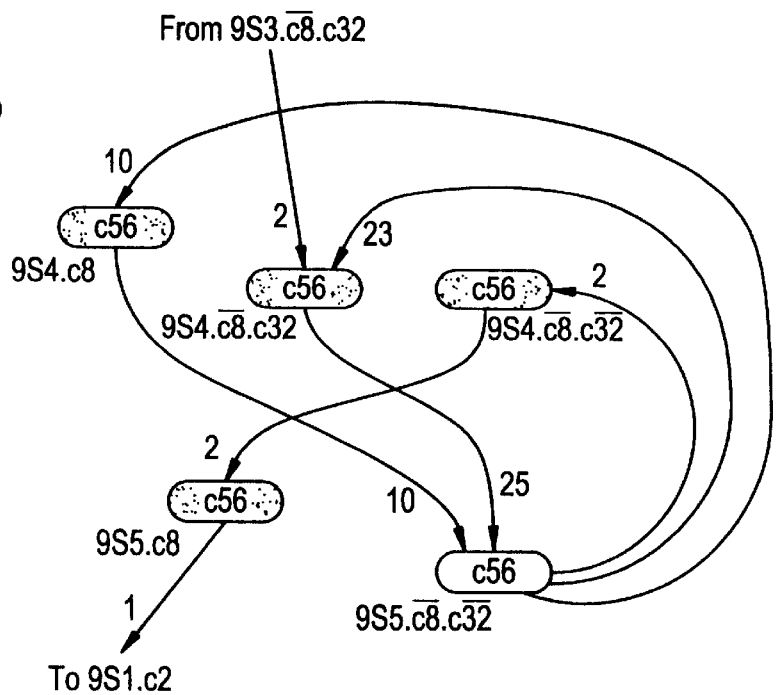

FIG. 9(b) shows labeling the activity graph to minimize zero-delay activity results in significant glitch propagation from c56 in FIG. 9(a).

Figure 9C:
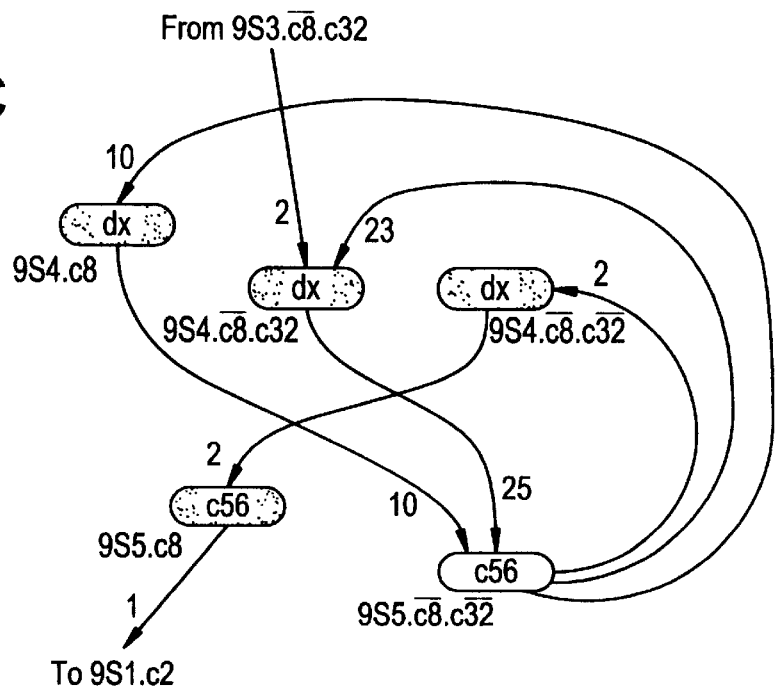

FIG. 9(c) shows an alternative labeling for the activity graph that reduces glitch propagation in FIG. 9(a).

Figure 10A:
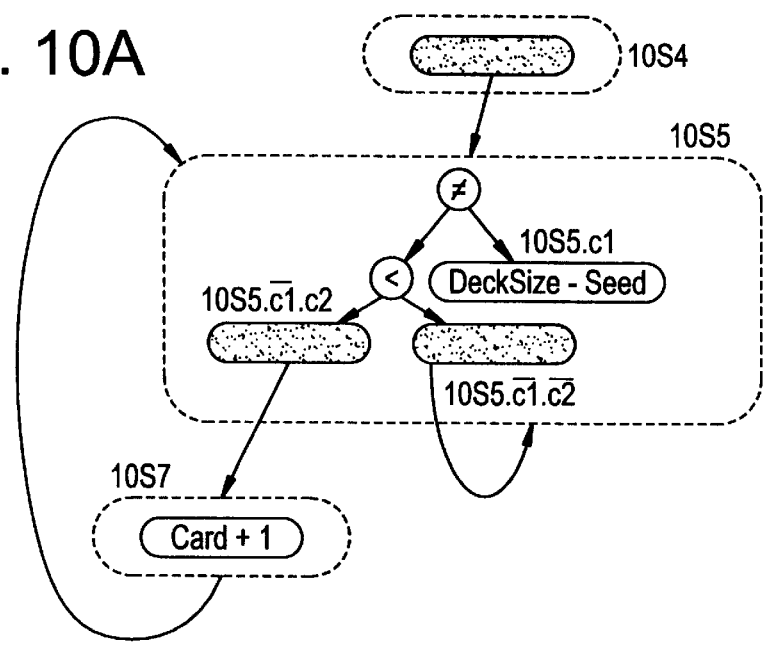

FIG. 10(a) shows a simplified activity graph for the ALU in the Dealer example.

FIG. 10(b) shows merging sub-states in the activity graph of FIG. 10(a)

Figure 10A:
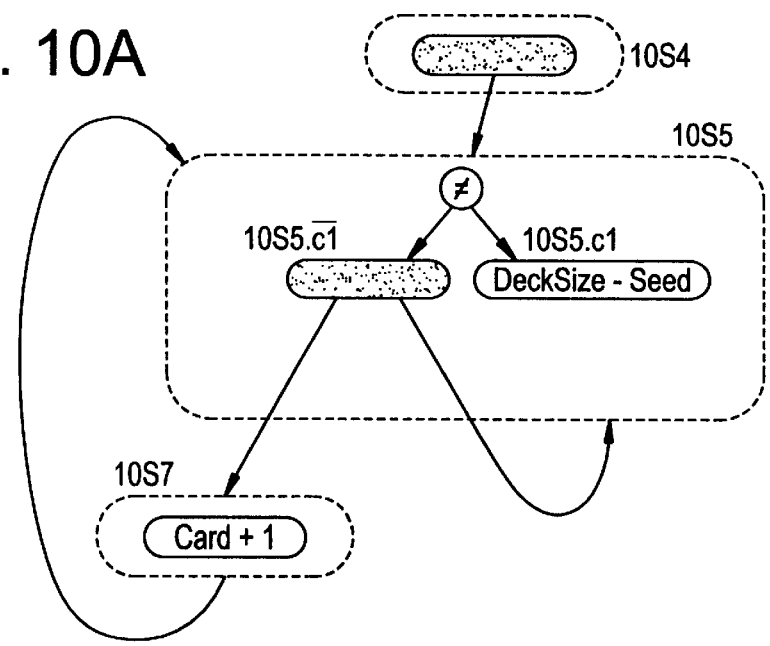
Figure 10C:
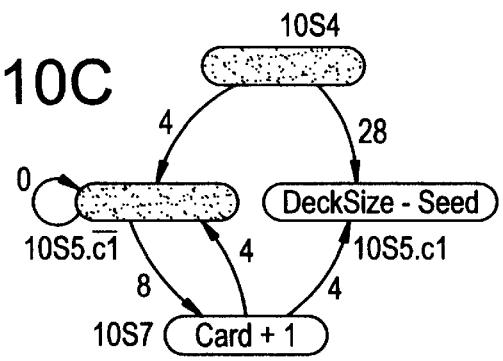

FIG. 10(c) shows final activity graph indicating merged sub-state transitions and their execution counts.

Figure 11A:
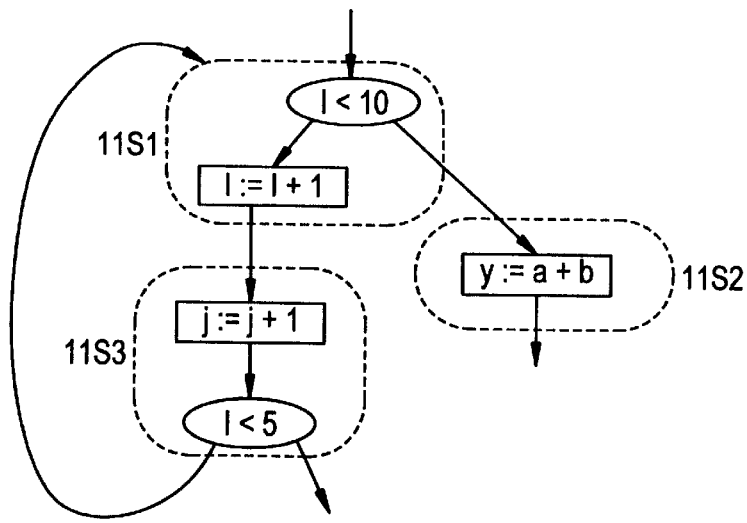

FIG. 11(a): Partial scheduled behavioral specification that illustrates formation of false combinational cycles.

Figure 11B:
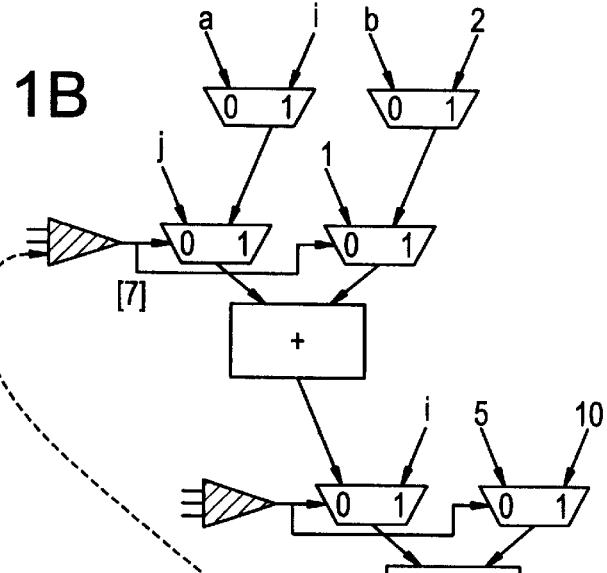

FIG. 11(b) shows RTL circuit corresponding to FIG. 11(a) indicating the dependency introduced due to controller re-specification in dotted lines.

Figure 11C:
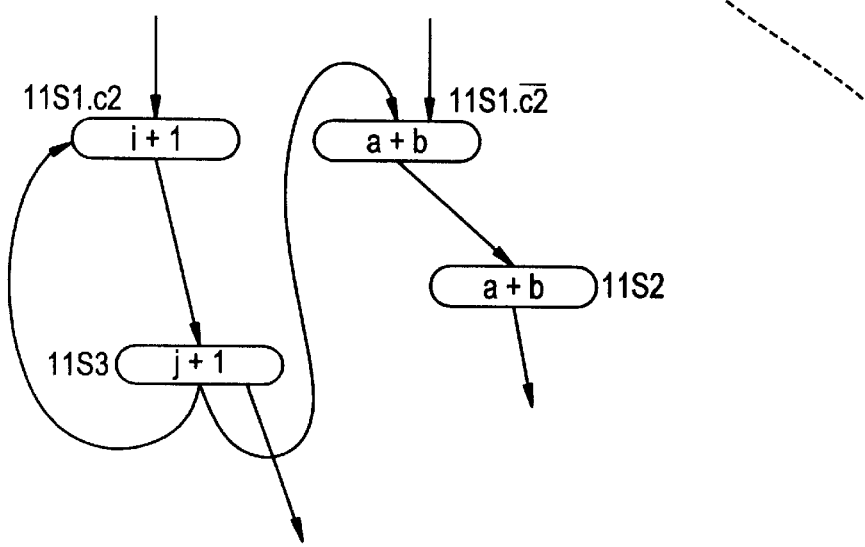

FIG. 11c shows an activity graph for the (<) comparator with a labeling that leads to the formation of the false combinational cycle.

FIG. 12 shows an overview of the controller re-specification algorithm of the present invention.

Figure 13:
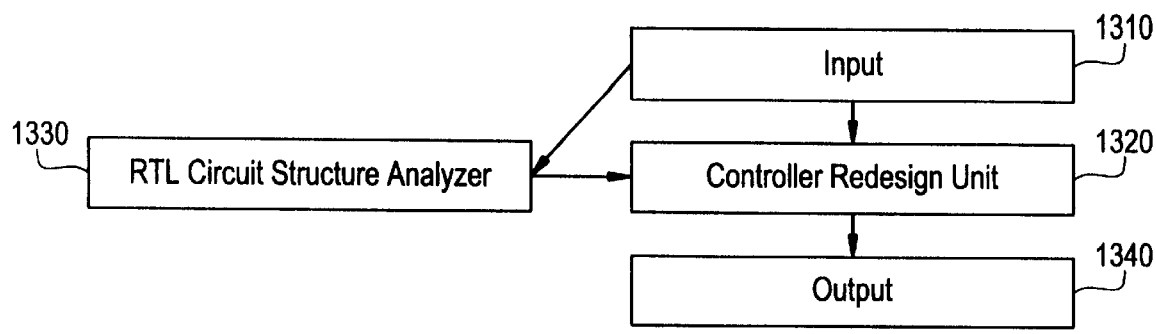

FIG. 13 shows a preferred embodiment of a system that performs controller re-specification according to the present invention.

Figure 14:
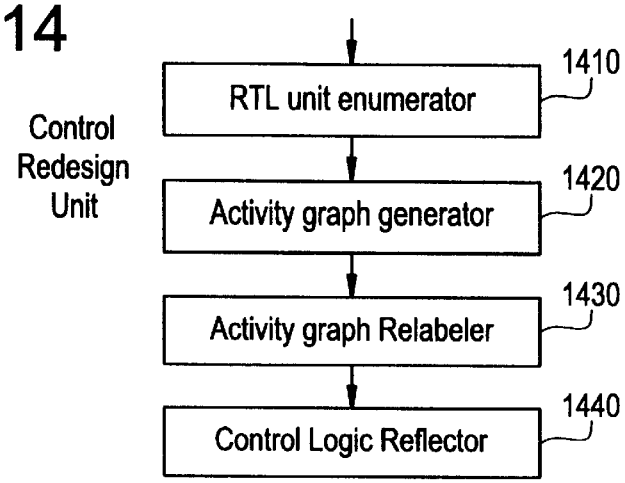

FIG. 14 shows further improvements to the redesign unit.

Figure 15:
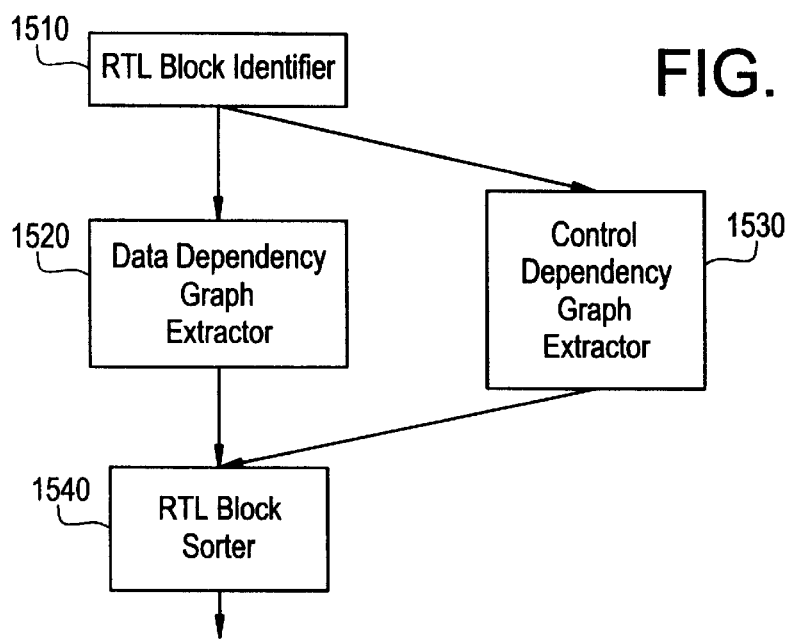

FIG. 15 shows further improvement to the RTL circuit structural analyzer.

Figure 16:
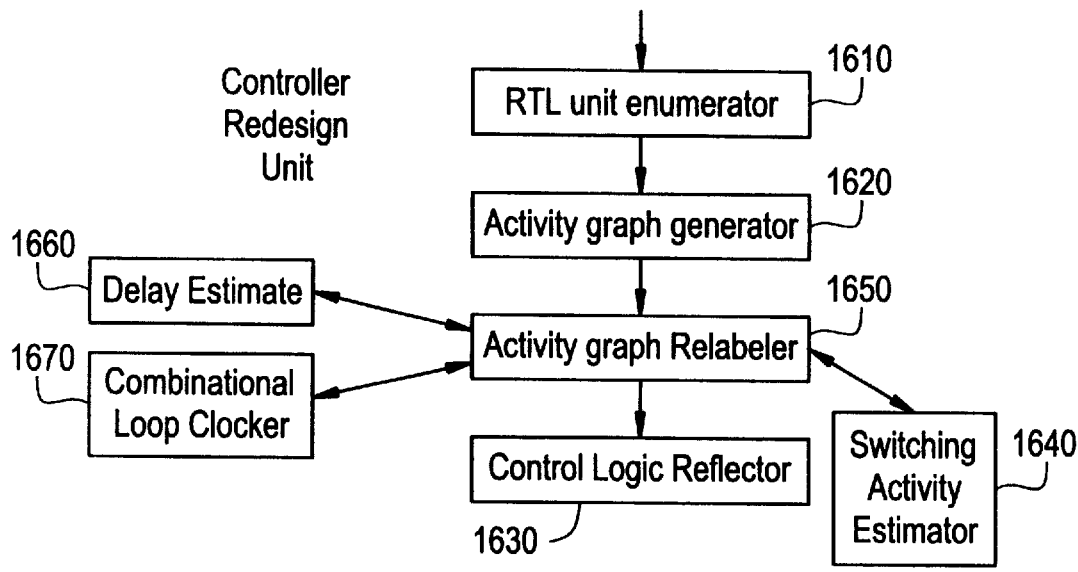

FIG. 16 shows improvements to the controller redesign unit.

Figure 17:
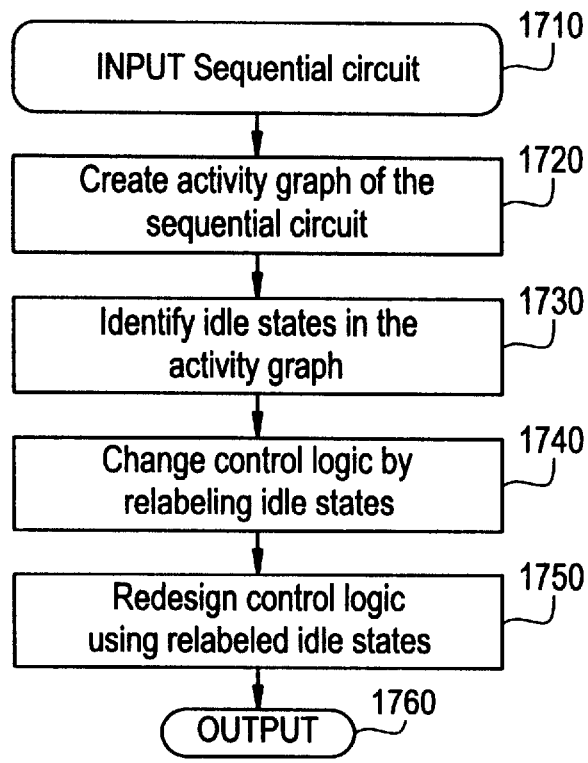

FIG. 17 depicts a flowchart representing an embodiment of a method for changing control logic for a sequential circuit to reduce power consumption.

Figure 18:
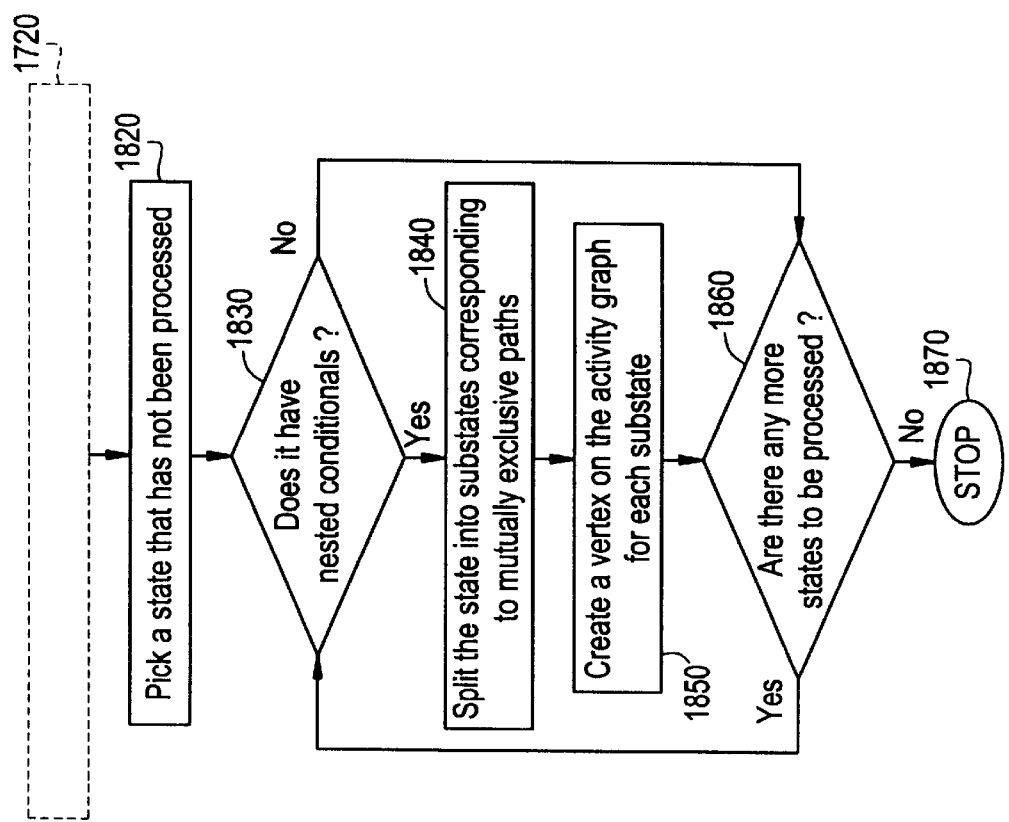

FIG. 18 shows a flowchart representing an embodiment of a method to modify an activity graph to account for nested conditionals according to the present invention.

Figure 19:
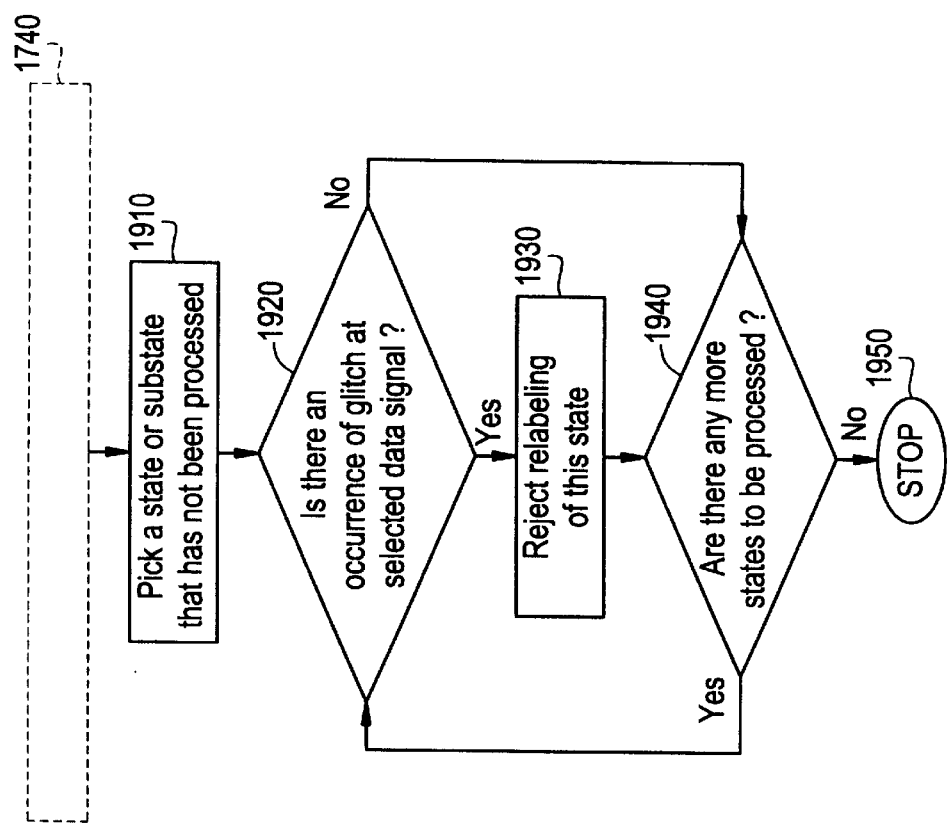

FIG. 19 shows a flowchart representing an embodiment of a method to modify an activity graph to account for nested conditionals according to the present invention.

Figure 20:
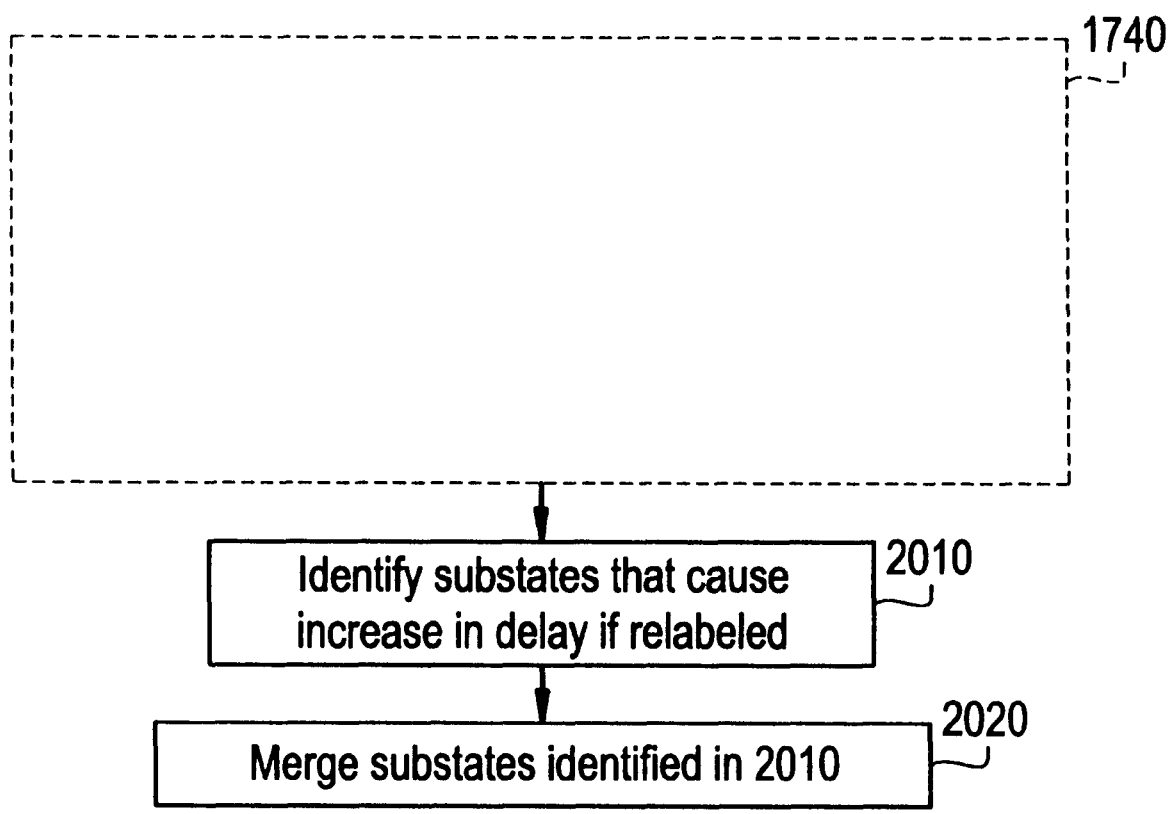

FIG. 20 shows a flowchart representing an embodiment of a method to modify an activity graph to account for increase in delay.

Figure 21:
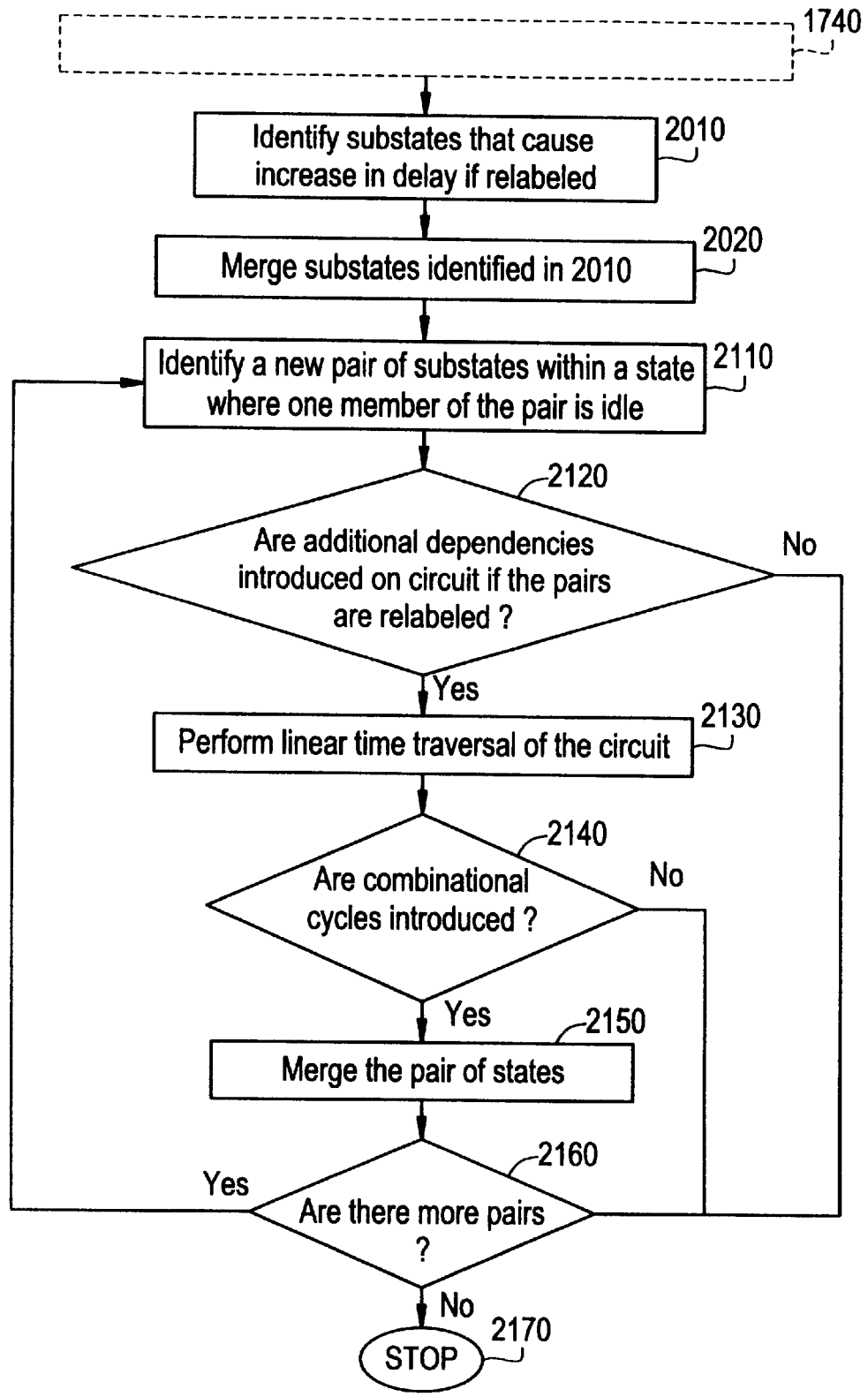

FIG. 21 shows a flowchart representing an embodiment of a method to modify an activity graph to account for additional dependencies and combinational cycles.

Figure 22:
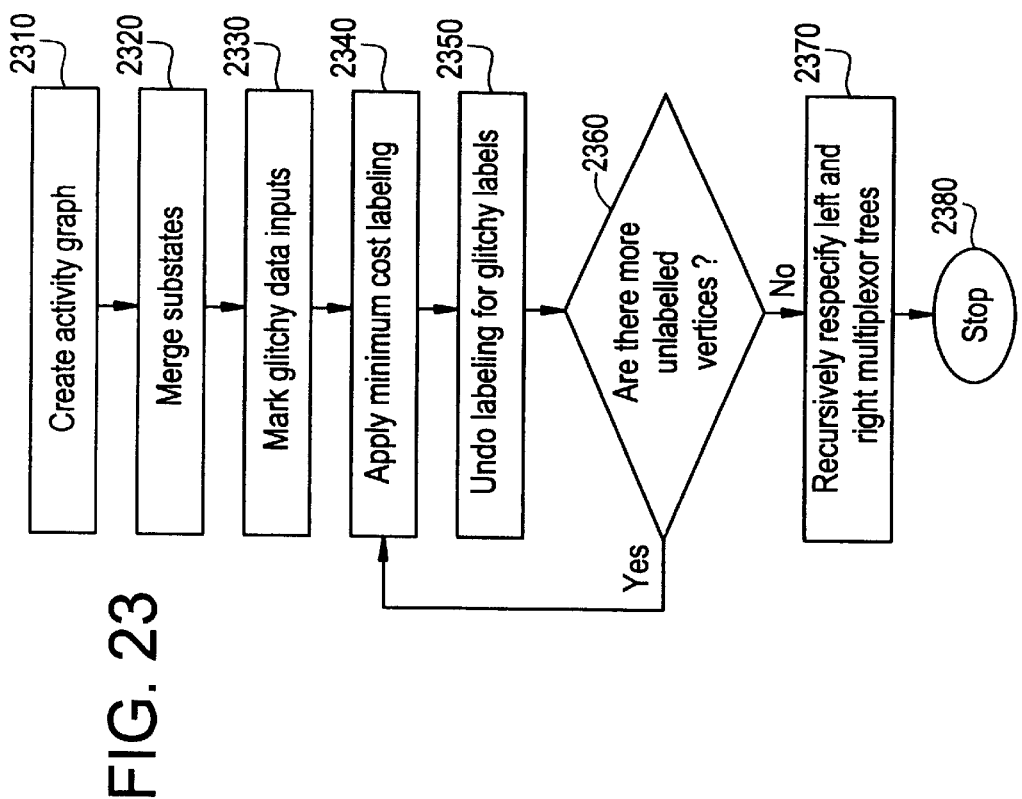

FIG. 22 shows a flowchart representing a preferred embodiment of a method of power management through controller re-specification.

Figure 23:
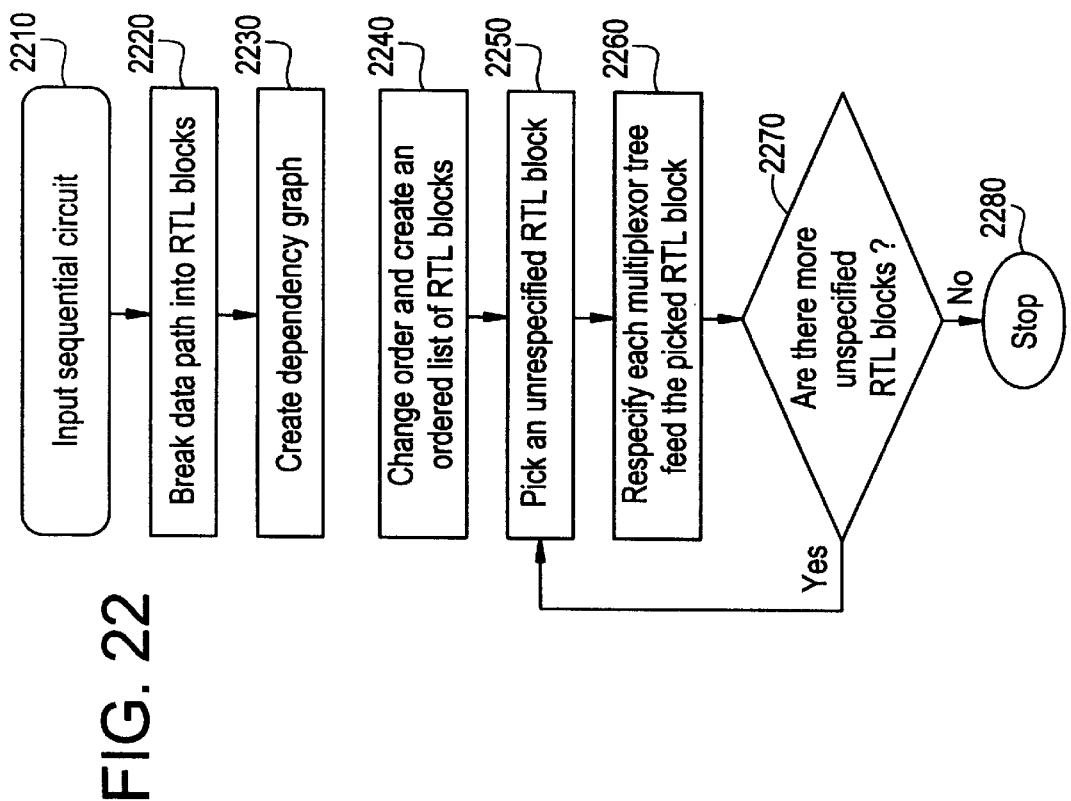

FIG. 23 shows a flowchart representing a preferred embodiment of a method of re-specification according to the present invention.

Figure 24:
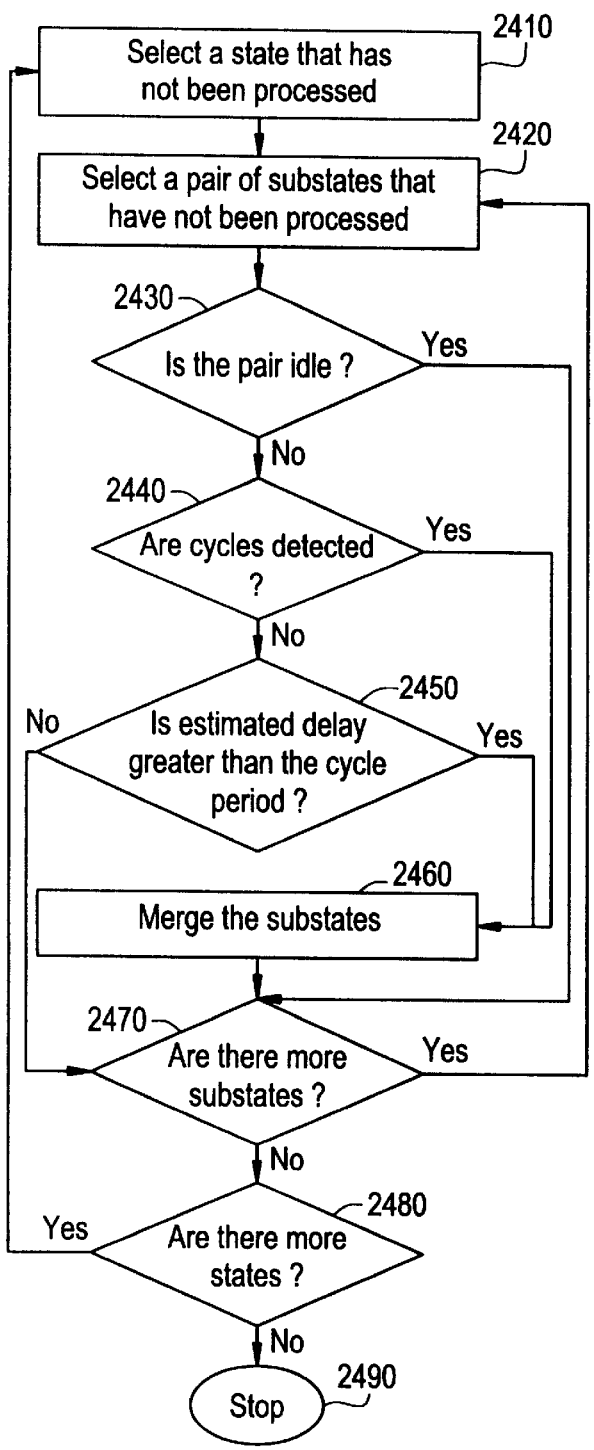

FIG. 24 shows a flowchart representing a preferred embodiment of a method for merging substates according to the present invention.

Figure 25:
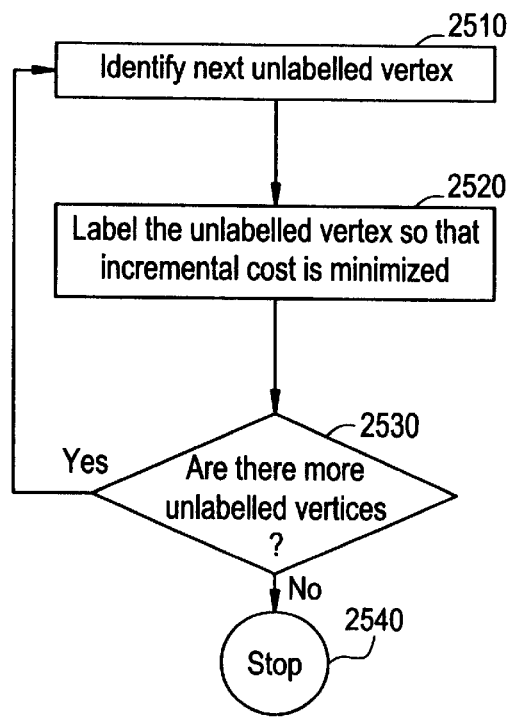

FIG. 25 shows a flowchart representing a method of applying minimum cost labelling.

IV. DETAILED DESCRIPTION

IVA. Controller Re-specification

In this subsection broad principles which help in understanding controller re-specification are discussed. The controller re-specification technique, according to the present invention, is partially aimed at power management in the data path of a sequential circuit. Herein, power reduction is achieved by redesigning the logic that generates control signals to the data path of the sequential circuit. A circuit redesigned according to the present invention has reduced activity in various data path components. The paths in which activity is reduced may include internal signals of multiplexer trees and inputs to functional units and comparators.

Like all other conventional power management techniques described in the background section (e.g. operand isolation by inserting transparent latches), the technique of the present invention is also based on exploiting idle conditions for various data path components. The idle conditions are the controller states/conditions where the results computed are not used.

However, unlike conventional techniques, controller re-specification according to the present invention produces low overheads while performing power management. In the present technique the designer merely changes the control logic of a sequential circuit to reconfigure the existing multiplexer networks feeding the SUP during idle states/conditions, such that unnecessary activity is minimized.

An important distinction between controller re-specification and conventional techniques is to be noted. While conventional power management techniques seek to eliminate activity in the SUP completely, the present invention only reduces activity significantly. It does not always eliminate such activity completely. The present method yields the desired results because it reduces activity while avoiding the overheads associated with conventional shut-off based techniques. Also, controller re-specification according to the present invention can be used for reducing activity even in relatively small blocks like multiplexers.

It should be noted that the notion of using output don't care states for the controller derived from the data path and an analysis of the data path has been used in conventional systems in the context of area and delay reduction. See R. Bergamaschi, D. Lobo, and A. Kuehlmann, "Control Optimization in High-Level Synthesis Using Behavioral Don't Cares," in *Proc. Design Automation Conf.*, pp. 657–661, June 1992 and C. Y. Huang and W. H. Wolf, "Performance-Driven Synthesis in Controller-Datapath Systems," in *IEEE Trans. VLSI Systems*, vol. 2, pp. 68–80, March 1994.

The controller re-specification techniques of the present invention exploit similar don't care information. However, a key aspect of this invention is the manner in which these don't cares are specified to minimize data path power consumption.

It is of interest that for control-flow intensive designs, considering several potential negative effects of power management is important. For example, performing power management in some parts of the circuit can increase the delay of the circuit significantly. Additionally, it is known that glitching activity can account for a significant portion of the total power consumption in typical RTL circuits. For control-flow intensive designs, it was shown in A. Raghunathan, S. Dey, and N. K. Jha, "Glitch Analysis and Reduction in Register-Transfer-Level Power Optimization," in *Proc. Design Automation Conf*, pp. 331–336, June 1996, that accounting for glitching activity at the control signals is particularly important.

Therein, a comprehensive analysis of the effects of power management through controller re-specification on the glitching activity at various control and data path signals in the RTL circuit is provided. Therein, it is further shown that ignoring these effects can lead to a significant increase in glitching power, which may more than offset any power savings obtained.

Likewise, controller re-specification can also lead to the formation of false combinational cycles in the RTL circuit, which may be unacceptable due to the limitations imposed by lower-level synthesis tools. Based on the above-mentioned insights, techniques of the present invention judiciously perform controller re-specification while avoiding the negative effects. The techniques of the present invention are used to create a controller re-specification/power management algorithm for control-flow intensive designs.

IV.B Effects of Using Controller Re-specification

Figure 1:
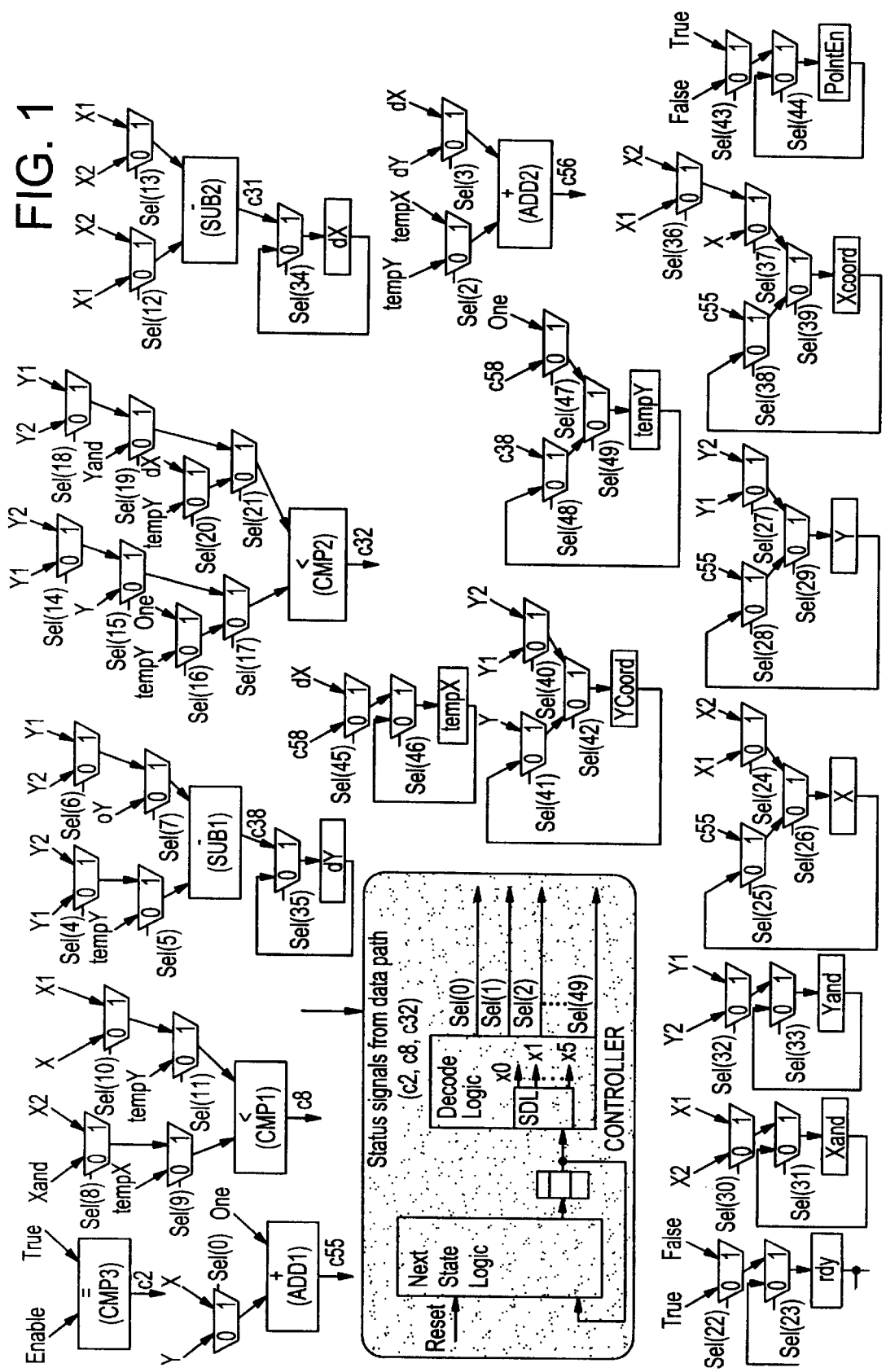
FIG. 1 shows a circuit that implements a line drawing process that is part of a graphics controller chip.
Figure 2C:
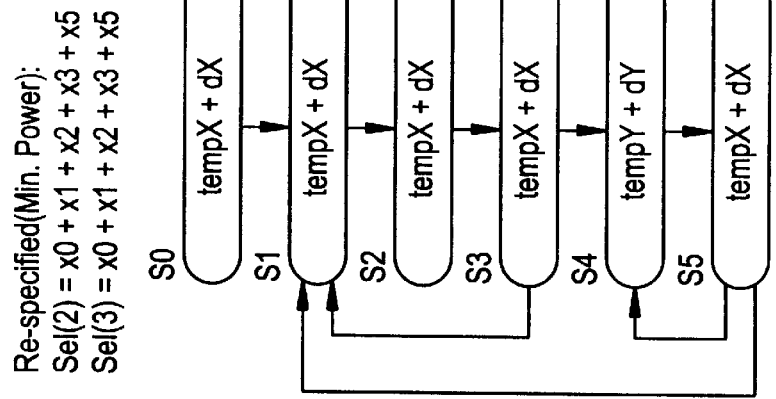
FIG. 2(c) shows a modified activity graph for the adder, and the corresponding modified logic expressions for the control signals that feed from the adder.
Figure 2B:
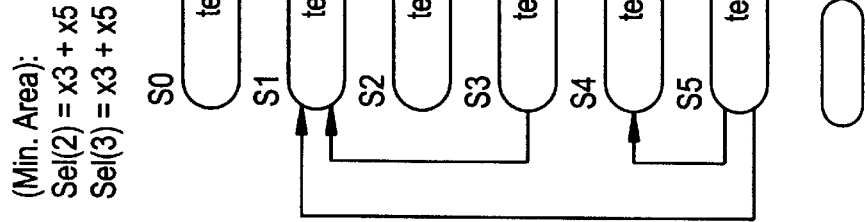
FIG. 2(b) shows the logic expressions for the control signals that feed the adder and its multiplexer tree, and an activity graph for the adder.
Figure 2A:
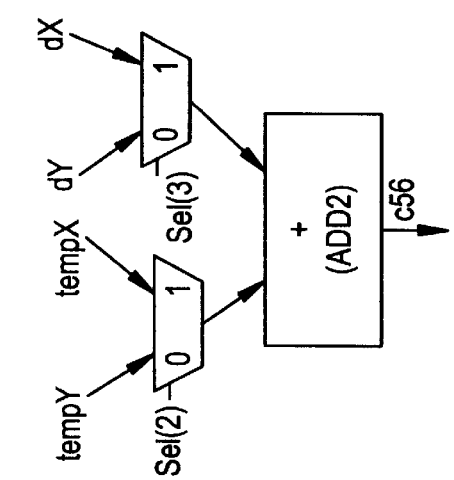
FIG. 2(a) shows an extracted part of the data path of the circuit of FIG. 1, that consists of an adder and the multiplexer trees that feed it.

The effect of using the controller re-specification technique can be best illustrated using examples. The following example illustrates the effect of re-specifying control signals on the activity of data path signals according to the present invention. Consider the RTL circuit shown in FIG. 1. This circuit implements a line drawing process (PixelGen) that is part of a commonly used graphics controller chip. In FIG. 2(*a*) a part of the PixelGen data path of FIG. 1 is extracted. This consists of an adder ADD2 and multiplexer trees M(2) and M(3) that provide inputs to the adder. FIG. 2(*b*) shows:

(i) the logic expressions for the control signals that feed the adder ADD2 and its multiplexer trees (xi represents a decoded state variable, i.e., xi=1 when the controller is in state Si), and (ii) an activity graph for the adder, which shows the operations performed by the adder in each of the controller states S0, S1, S2, S3, S4, S5 and S6.

An activity graph, in general, shows the operations performed by a unit in ints various controller states. The vertices and arcs in the activity graph correspond to the controller states and state transitions. Each vertex, shaped like an oval, in the activity graph is labeled with the computation performed by the adder in the corresponding controller state. Arcs are the arrows connecting vertices. They represent transitions from one state to the other.

For example, consider controller state S3, for which control signals Sel(2), Sel(3) both assume the logic value 1. From these values, it can be easily seen that the adder performs the operation tempX+Dx in state S3.

A close analysis reveals that in some states, like S0, the adder may not be required to perform any operation. In such states the results may be unused. These states are called idle states. Using the scheduling and assignment information from high-level synthesis, identifying such idle states easily is possible based on the absence of operations assigned to the adder. In FIG. 2(*b*), such idle states are shown by shaded vertices. The computation performed by the adder in idle states can be changed without affecting the functionality of the design. Therefore, the logical result of the circuit does not change when the computation performed by the adder in such idle states are changed.

Considering the above, the control signals Sel(2), Sel(3) are re-specified using techniques from further aspects of this invention described in detail in subsequent sections.

The resulting logic expressions for the re-specified control signals and the modified activity graph for the adder are shown in FIG. 2(*c*). Note that, in this modified activity graph the labels of the vertices in the activity graph have changed. In states S0, S1 and S2, the labels have changed from tempY+dY to tempX+dX.

Further, in the above-mentioned example consider two consecutive cycles in the operation of the PixelGen circuit, during which the controller makes the state transition S2→S3. Under the original control expressions prior to re-labeling, there is switching activity in the adder since its operands change from tempY (left operand) and Dy (right operand) in S2 to tempX and Dx, respectively, in S3.

On the other hand, under the re-specified control expressions all input operands to the adder remain stable. This is because S2 and S3 have identical labels after the above mentioned re-labeling.

It can thus be seen that re-specification of the control signals feeding the adder in the above example reduces switching activity. As an operational equivalence to the re-specification, re-labeling of the adder's activity graph also reduces the switching activity. The reduction in switching activity leads to reduced power consumption by the adder.

However, during the actual operation of the circuit, controller state transitions other than S2→S3 will also occur. Therefore, considering all incoming and outgoing arcs is necessary while deciding how to re-label an idle vertex in the activity graph. This is done by using state transition probabilities or transition counts in labeling the activity graph. Such a method forms another aspect of this invention and is formalized and described subsequently.

Additionally, re-specifying the controller can also lead to reduced activity within multiplexer trees. FIG. 3(*a*) shows a part of the data path of another example RTL circuit that consists of a register with the multiplexers M(18) and M(19) feeding it. The register stores the value of i.

The original expressions for control signals Sel(18) and Sel(19) are given in FIG. 3(*b*). The activity graph for the signal M(18) (the output of the 2-to-1 multiplexer) that shows which operand (c28 or Zero) is selected at M(18), is also shown in FIG. 3(*b*). The shaded vertices in the activity graph correspond to states S0, S1, S2, S4, S6 and S7 in which the value of signal M(18) is not used. Consider the controller state transition S7→S1. Signal c28 is the output of an ALU (not shown in the figure), whose inputs change during the above mentioned controller state transition from S7 to S1. Thus, the value of the operand (c28) to the multiplexer itself changes, leading to unnecessary activity at the output signal from M(18).

Figure 3C:
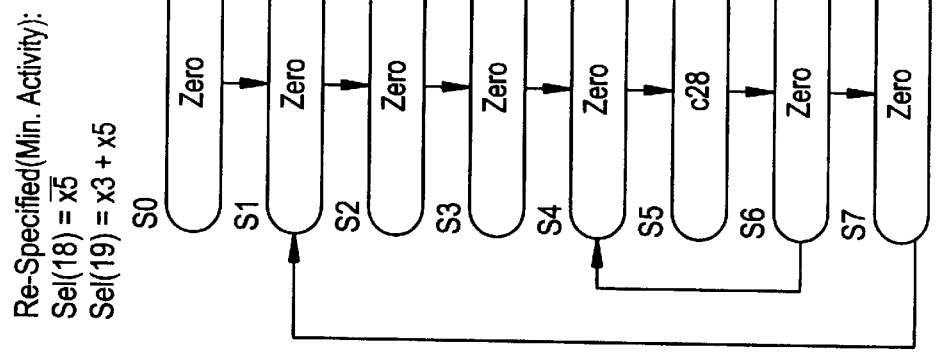
FIG. 3(c), shows unnecessary activity at M(18) eliminated.
Figure 3B:
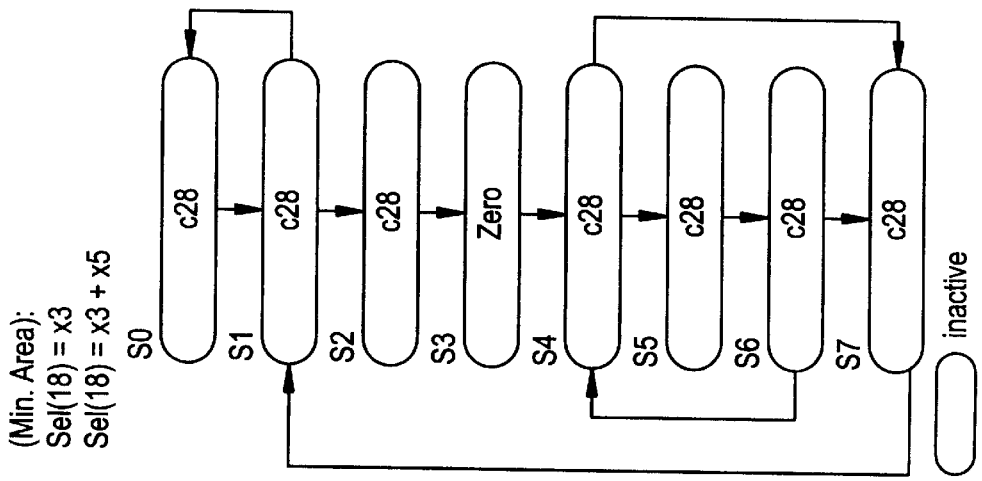
FIG. 3(b) shows original expressions for control signals Sel(18) and Sel(19) given in FIG. 3(b).

Re-specifying the control signals using the techniques of the present invention, as shown in FIG. 3(c), eliminates this unnecessary activity at M(18). As shown in the figure S0, S1, S2, S4, S6 and S7 are changed from c28 to zero.

Figure 3A:
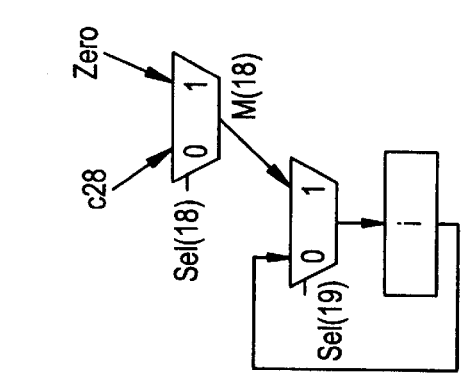
FIG. 3(a) shows a part of the data path of another example RTL circuit.

A conventional method for reducing activity in the multiplexer tree shown in FIG. 3(a) is to insert transparent latches at a selected multiplexer's data input corresponding to signal c28 and its select input, subsequently and "freezing" those transparent latches in states S0, S1, S2, S4, S6, and S7. In such a case, the overhead incurred would be nine transparent latches. It should be noted that c28 is an 8-bit signal. It can be clearly seen that this method leads to results that constitute a significant cost in area and also power consumption compared while producing merely a modest power savings in the multiplexer tree.

Additionally, when transparent latches are inserted according to the conventional methods as described above, and the circuit evaluated for power consumption after mapping it to a 1.0µ standard cell library (low power latches were used to minimize the power overhead), the total circuit power consumption decreases from 4.495 mW initially to 4.461 mW after the shut-off circuitry is inserted. As is clear, this corresponds to a very small decrease in power consumption.

On the other hand, when the control signals are re-specified according to the present invention, as shown in FIG. 3(c), the total power consumption reduces from 4.495 mW to 4.291 mW.

Generalizing to the case of a b-bit m-to-1 multiplex tree, according to the conventional method b+m+log m transparent latches may be necessary. To a first degree of approximation, it can be seen that the cost in terms of transparent latches as well as the potential for savings in terms of how much logic that can be shut-off can be scaled similarly. This shows that using transparent latches according to the conventional method is unlikely to lead to significant reductions in power for larger multiplexers either.

The above hypothesis can be clearly verified in practice for several multiplexer trees from example RTL circuits. Even larger blocks like ALUs and comparators in the above mentioned PixelGen RTL circuit pose significant difficulties to power management using the conventional technique of inserting transparent latches.

For example, transparent latches are placed in front of the subtractor SU B1 in FIG. 1. Based on an analysis of the schedule and assignment information that are available from the high-level synthesis tool that generated the circuit, the idle conditions for SU *B1 are derived to be x0+x1+x3+x4. $\overline{c8.c32}$+x5.

Control circuitry is added to the circuit to implement the above expression. The arrival time of the control signal is found to be 117.1 ns. The earliest time at which inputs to SU B1 can make a transition is 4.7 ns. This is due to the path from the output of register tempY through the 2-to-1 multiplexer to the left input of SU B1. Clearly, the timing condition required to ensure that an early change in the data inputs do not slip through the power management circuitry is not met.

Next, an expression for a reduced set of idle conditions, using only decoded state variables, is derived. However, the required timing constraint is still not met.

The above problem occurs for all the functional units and comparators in the PixelGen circuit, making it difficult to apply conventional power management to such designs. By that, the advantages of the re-specification methods of the present invention are amply clear.

IV.C Re-specification by Relabeling the Activity Graph Using State Transition Counts and Activity Matrices Next, the re-labeling of the activity graph is discussed. This again can be better explained using examples.

Consider a less-than (<) comparator that is part of the data path in an RTL circuit and its partial activity graph. These are shown in FIGS. 4(a) and 4(b) respectively. Vertex S3 in the activity graph corresponds to an idle state for the comparator. The activity graph also shows all vertices that have incoming arcs from or outgoing arcs to vertex S3. Vertices S1, S2, S4, and S5 have the labels L1 (a<b), L2 (c<d), L2, and L3 (e<d), respectively.

In this example, using the techniques of the present invention, one can label vertex S3 with another label from the set {L1, L2, L3}. It can be seen clearly that such relabeling will minimize the activity, and therefore the power consumption, in the comparator.

For illustration, the expected (or average) number of bit transitions at the inputs of the comparator is used as a measure of its power consumption. However, incorporating more sophisticated models for data path power consumption to drive the controller re-specification technique of the present invention is possible.

The actual re-labelling, using the techniques of a preferred embodiment of the present invention, is illustrated as under. For each arc Si→Sj. in the activity graph, P(Si→Sj.) is the probability of a controller state transition from Si to Sj. An activity matrix $AM_{Si \to Sj}$ for arc Si→Sj in the activity graph is created. Such an AM stores the costs in terms of average bit transitions incurred for various combinations of labels that can be assigned to vertices Si and Sj. The rows of $AM_{Si \to Sj}$ are indexed by the set of possible labels that can be assigned to Si. Similarly the columns of $AM_{Si \to Sj}$ are indexed by the set of possible labels that can be assigned to Sj.

For example, consider the arc from vertex S1 to vertex S3 in the activity graph shown in FIG. 4(a). Since the label of S1 is fixed to L1, the activity matrix $AM_{S1 \to S3}$ has valid entries in only one row, indexed by L1. The vertices in the activity graph that correspond to idle conditions are re-labeled while attempting to minimize the Total Labeling Cost that is calculated using the following formula:

$$\text{Total Labeling Cost} = \sum_{all\ Si \to Sj} AM_{Si \to Sj}[L(Si), L(Sj)] \cdot P(Si \to Sj)$$

L(Si) refers to the label assigned to vertex Si in the activity graph. For the example of FIGS. 4(a)–(b), the cost of labeling vertex S3 with a label L* is given by.

$$AM_{S1 \to S3}[L1,L^*].P(S1 \to S3)+AM_{S2 \to S3}[L2,L^*].P(S2\ S3)+AM_{S3 \to S4}[L^*,L2].P(S3 \to S4)+AM_{S3 \to S5}[L^*,L3].P(S3 \to S5)$$

It should be emphasized that the aim is to choose L*ϵ{L1, L2, L3} such that the labeling cost, as given by the above equation, is minimized.

However, a prominent characteristic of control-flow intensive specifications is the presence of nested conditionals. In schedules of such specifications involving the presence of nested conditionals, many mutually exclusive sequences (paths) of operations may be scheduled in a single state. Subsequent sections explore various implications of conditionals within states and on controller-based power management. Also embodiments of the present invention that solve the problems encountered in such a case are discussed.

IVD. Controller Re-specification for Control-flow Intensive Designs

This section describes an embodiment of the present invention that extends the basic controller re-specification procedure to handle control-flow intensive designs. In such designs, nested conditional operations may be present in each controller state leading to several mutually exclusive conditional paths, called sub-states.

Specifically, in any given clock cycle (or controller state), a different set of operation is executed by the data path. This depends on how conditional branches within the state evaluate. In the activity graph for a data path component, a vertex is created corresponding to each mutually exclusive path or sub-state in each state. Earlier, only a single vertex was created for each state.

The notion of sub-states can be better understood using examples. Consider a partial schedule for a Dealer process shown in FIG. 5($a$). Scheduling was performed with an aim of minimizing the average number of clock cycles needed to execute this specification, subject to the resource constraints of one (<) comparator and one (+/−) ALU, and the delay constraint prohibiting data chaining between the (<) comparator and the ALU (to avoid formation of a long path).

For example, the operation Card=Card+1 has not been included in state 5S5 to avoid data chaining between the comparator that performs Card<Decksize, and the ALU that performs Card=Card+1. Two conditions are present in state 5S5: The Suits[Card]≠NoSuit, and Card<Decksize. These comparisons are performed by an equal-to and less-than comparator in the data path, whose outputs are c1 and c2, respectively.

Specifically, three mutually exclusive paths are present in state 5S5 that correspond to the cases {c1=0, c2=1}, {c1=0, c2=0}, and {c1=1}, respectively. FIG. 5($b$) shows the (+/−) ALU and the related multiplexer trees that are part of the RTL implementation.

A part of the activity graph for the ALU is given in FIG. 5($c$), which shows the activity of the ALU in states 5S4, 5S5, and 5S7. Note that state 5S5 of the schedule has been broken into three sub-states in the activity graph, corresponding to each of the three possible mutually exclusive paths in the schedule.

The sub-states in the activity graph are marked with the combination of state and comparator outputs that cause the corresponding conditional path to be taken. The ALU needs to perform an operation only in sub-state 5S5.c1. The other two sub-states, 5S5.$\overline{c1}$.c2 and 5S5.$\overline{c1}$.$\overline{c2}$, are idle sub-states as indicated by the shading. The arcs in the activity graph indicate transitions between sub-states, and are annotated with the number of times the corresponding sub-state transition was executed during the simulation of a particular testbench.

According to the original control signal specification, whenever the controller is in state 5S5, the operation DeckSize−Seed is executed (including in the idle sub-states 5S5.$\overline{c1}$.c2 and 5S5.$\overline{c1}$.$\overline{c2}$,). For a sequence of execution of the sub-states, {5S5.$\overline{c1}$.c2, 5S7, 5S5.$\overline{c1}$.c2, . . . } the ALU will execute the following sequence of operations: {DeckSize−Seed, Card+1, Decksize−Seed, . . . }, thereby generating significant activity in the ALU. Considering each sub-state of state 5S5 separately, and recognizing the presence of the two idle sub-states leads to the opportunity of assigning them a label that is different from the label of the active sub-state. For instance, since sub-state 5S5.$\overline{c1}$.c2 has transitions to and from state 5S7, it makes sense to label sub-state 5S5.$\overline{c1}$.c2 with the same label as state 5S7 (Card+1), since the value of Card does not change in state 5S5.

After the re-labeling, for a sequence of state transitions involving states 5S5 and 5S7 in an alternating way, the ALU operands will remain stable at Card+1, thereby avoiding unnecessary activity in the ALU.

IVE. Effects of Controller-based Power Management on Glitching Activity

As mentioned earlier, controller re-specification attempts to minimize the average or expected zero-delay switching activity at the inputs of the RTL component under consideration. However, minimizing the zero-delay activity alone does not translate to reduction in power consumption due to the presence of glitching activity at various control as well as data path signals in the RTL circuit. An aspect of the present invention is a method for reducing glitching activity while applying power management techniques. However, an understanding of how glitches are created is required to appreciate this aspect of the present invention fully.

It is well known that the presence of glitches at control signals may lead to the creation and propagation of a significant amount of glitches through the various data path components. See A. Raghunathan, S. Dey, and N. K. Jha, "Glitch Analysis and Reduction in Register-Transfer-Level Power Optimization," *Proc. Design Automation Conf*, pp. 331–336, June 1996. In effect, any savings in power may be offset by an increase in power consumption due to glitches.

Overall the above negative effects manifest themselves while applying any power management technique. Likewise, the issue of considering glitching activity at various signals during power management also applies to power management based on controller re-specification. Similar techniques can be used in other power management techniques.

FIGS. 6($a$)–($b$) present an overview of the possible negative effects of power management on glitching activity. FIG. 6($a$) represents a generic power management technique for a circuit that uses transparent latches to suppress transitions from propagating to a subcircuit's inputs when an appropriate control condition is true.

It is possible that the data inputs of the transparent latches in the above circuit have some glitching activity. This can lead to transitions propagating through to the inputs of the SUP. The waveforms shown in FIG. 6($a$) illustrate this situation.

Assume that the transparent latch is in transparent mode when the "enable" signal is logic 0, and in the hold mode when the "enable" signal is logic 1. The glitching activity at the data input of the transparent latch propagates onto the inputs of the SUP, causing unnecessary power dissipation. Similarly, it is possible that the "enable" signal to the transparent latch is also glitchy. The effects of a glitchy "enable" signal depend on the exact implementation of the transparent latch. For a typical implementation that uses inverters and transmission gates, glitches at the "enable" signal do not affect the latch output only if the data signal is glitch-free.

FIG. 6($b$) gives an overview of the effects of the controller-based power management technique on glitching activity. Since the technique of the present invention involves redesigning some control logic, it is possible that the glitching activity on one or more re-specified control signals can increase.

In addition, some data inputs feeding the multiplexer network at the inputs of the SUP may themselves be glitchy (e.g., outputs of ALUs chained to other units). Ignoring the glitching activity of the data signals during re-specification can lead to an increase in glitch propagation from the glitchy data signals through the multiplexer tree feeding the SUP.

The above two effects can be called local effects, since the increase in glitching activity starts at some control signals or multiplexer trees that directly feed the SUP. In addition, considering global effects of re-specification on glitching activity is also important.

For example, suppose the SUP is a comparator whose output is used as an input to some control logic. Re-specification of the control logic feeding the SUP can lead to significant generation of glitching activity at control signals that depend on the SUP's output.

In general, all control signals in the transitive fanout of the SUP, i.e. all control signals to which there exists a path from the output of the SUP that passes through only combinational elements, can become glitchy because of re-specifying control signals that feed the SUP.

Subsequent sections analyze the various effects that power management based on controller re-specification can have on glitching activity at control and data signals in the circuit, and outlines the techniques used in different aspects of this invention to ensure that the power savings are not offset by an increase in power consumption due to glitching.

IVE.1 Glitching Activity at the Re-specified Control Signals

Re-labeling a state or sub-state in the activity graph of an RTL unit aimed at reducing activity in the unit may create glitches at the resulting re-specified control signal(s). To illustrate the generation of glitches on re-specified control signals, consider an (=) comparator C M P2 and the multiplexer feeding it as shown in FIG. 7(a), that are part of an RTL implementation of a barcode reader.

A partial activity graph for C M P2 is shown in FIG. 7(b). State 7S3 is broken down into two sub-states 7S3.c20 and 7S3.$\overline{c20}$, both of which are idle sub-states for C M P2. The original control expression (Sel(7)=x4) implies that the comparator executes operation limit=0 in state 7S4; in all other states and sub-states, operation limit=black is executed.

Thus, for a controller state sequence {7S3.c20,7S4, 7S3.c20, . . . }, the sequence of operations {limit=black, limit=0,limit=black, . . . } will be executed by comparator C M P2, thereby leading to unnecessary switching activity.

The above activity can be eliminated, using techniques of the present invention, by re-labeling the sub-state 7S3.c20 to limit=0 and sub-state 7S3.$\overline{c20}$, to limit=black. Equivalently, the control signal Sel(7) has to be re-specified to: Sel(7)= x3.c20+x4, where c20 is the output of another comparator named C M P1 that performs the (=) operation in state S3 of FIG. 7(b). However, this re-specification leads to significant glitch generation at Sel(7), as shown next.

Consider the re-specified control signal Sel(7), and a pair of consecutive clock cycles in the operation of the circuit during which the controller makes a transition from state 7S4 to sub-state 7S3.c20. The logic that generates the re-specified control signal Sel(7) is shown in FIG. 7(c). The transitions at various signals in the logic that generates Sel(7) are also shown in the figure.

For the transition from 7S4 to 7S3.c20 to occur, the output of comparator C M P1 should be 0 in state 7S4 and 1 in state 7S3, leading to a rising transition at c20 (the output of C M P1). A rising transition at x3 and a falling transition at x4 are also present. Since the rising transition at c20, which is the output of a comparator, arrives later than the transitions at x3 and x4, which represent the decoded controller state, a temporary falling transition (glitch) occurs at Sel(7) before it rises again.

So, though the re-specification of Sel(7) seems to reduce unnecessary activity in comparator C M P2, generation of glitches at the re-specified control signal actually results, thus potentially offsetting any power savings attained. The controller re-specification algorithm of the present invention checks for creation of glitches at the re-specified control signals in each re-labeled state/sub-state, using the RTL switching activity and power estimation techniques presented in A. Raghunathan, S. Dey, and N. K. Jha, "Register-Transfer Level Estimation Techniques for Switching Activity and Power Consumption," in *Proc. Int. Conf. Computer-Aided Design*, pp. 158–165, November 1996, that can estimate glitching activity at data paths as well as control signals.

For states/sub-states in which glitches are generated, the re-labeling is rejected, and an alternative labeling, if any, is considered, as explained subsequently. In the earlier Barcode example, the re-labeling of 7S3.c20 to limit=0 is rejected, and its original label of limit=black is restored.

IVE.2 Glitching Effects in the Transitive Fanout of the Re-specified Control Signals Avoiding an increase in the glitching activity locally, i.e., at re-specified control signals is not sufficient to ensure that power savings will result from re-specifying a control signal. Re-specifying a control signal can possibly result in increasing glitching activity at any of the data and control signals in the transitive fanout of the directly affected sub-circuit.

For example, consider the partial RTL circuit shown in FIG. 8(a) that consists of an equal-to comparator feeding an ALU. The control signals feeding the comparator were re-specified according to the present invention to reduce unnecessary activity in the comparator itself. A part of the original and re-labeled activity graphs for the comparator are shown in FIG. 8(b).

As a result of the re-specification, it is found that the glitching activity on control signal contr[3], that feeds the multiplexers at the ALU inputs, increases significantly, leading to significant glitching power consumption in the ALU. Clearly, identifying and avoiding such situations is essential to derive maximum power savings from controller re-specification.

The generation of glitches at control signal contr[3] can be explained as follows. The data statistics of the comparator output (c11), before and after re-specification, are given in the table shown in FIG. 8(b). For example, c11 assumes the value 0 in both states 8S2 and 8S3 ten times originally, and twice after re-specification. Note that the re-specification affects the zero-delay signal statistics at the comparator output. The total switching activity (number of 0→1 and 1→0 transitions) at the comparator's output decreases due to the re-specification. However, the number of 1→O transitions alone at c11, when the controller makes a state transition from 8S2 to 8S3, increases significantly. This leads to glitching activity at the output of the AND gate that generates contr[3], as shown in FIG. 8(c).

IVE.3 Impact of Re-specifying a Control Signal on the Re-specification of Other Control Signals in its Transitive Fanout In the example of FIG. 8, the logic expression for control signal contr[3] was assumed to be known while re-specifying the control signal feeding the (=) comparator. However, since the various RTL circuit components are visited sequentially, it is possible that the final logic expressions of some control signals in the transitive fanout of the SUP are not known, since the corresponding RTL components have not yet been visited for power management.

In such situations, the lack of knowledge about the control signal expressions makes it difficult to predict the global effects of re-specification on glitching activity. Clearly, it is desirable that such a situation be avoided to the extent possible. Therefore, the controller re-specification procedure of the present invention attempts to re-specify all control signals in the transitive fanout of a comparator before re-specifying the control signals feeding the comparator itself. If performing re-specification in the above fashion is possible, predicting the (global) effect of re-labeling the comparator's activity graph on the glitching activity at all control signals that depend on the comparator output is also possible.

IVE.4 Re-specification and Glitch Propagation from Data Signals

As can be seen, the net effect of controller re-specification is to reconfigure the various multiplexer trees in the data path to select their data inputs so that switching activity at various data path signals, and therefore power consumption, is minimized.

The re-specification procedure of the present invention chooses the best label for each idle vertex in the activity graph such that the expected or average zero-delay switching activity at the inputs of the SUP is minimized. However, this may not translate to a reduction in the actual switching activity in the SUP when some data signals feeding it are glitchy.

For example, consider part of the PixelGen RTL circuit shown in FIG. 9(a), that consists of a multiplexer tree feeding a register. One of the inputs to the multiplexer tree, c56, is the output of an ALU, and is glitchy. Suppose the aim is to re-specify the control signal Sel(45) in order to minimize the switching activity at signal M45. FIG. 9(b) shows a part of the activity graph for signal M45. The activity graph labeling shown in FIG. 9(b) was obtained based on the relabeling techniques of the present invention, without considering the fact that signal c56 is glitchy. The figure also shows the resulting control expression, and the cumulative switching activity at all bits of signal M45 including and excluding glitches. Note that glitching accounts for a significant part of the activity at signal M45.

Upon further analysis, the cause of most of the glitching activity at M45 can be shown to be glitch propagation from c56. Noting that the glitching activity from c56 propagates to M45 when Sel(45) assumes a value of 0, the following experiment identifies the issues completely.

The PixelGen RTL circuit is implemented, and the glitching activity at c56 is measured in each sub-state separately. Given the above information, a relabeling of the activity graph of M45 is performed while attempting to avoid selecting the label c56 in sub-states in which the ALU output was known to be glitchy.

Resulting labeled activity graph is shown in FIG. 9(c), along with the corresponding logic expression for Sel(45), and the activity statistics for M45. Note that although a slight increase in the zero-delay switching activity at M45 occurs, the total activity at M45 significantly decreases, largely due to a reduction in glitch propagation from c56 in the various sub-states that constitute state S4.

IVF. Effect of Controller Re-specification on Performance

This section demonstrates that assigning labels to the idle sub-states indiscriminately may lead to an increase in the delay of the power-managed circuit. It has been shown in C. Y. Huang and W. H. Wolf, "Performance-Driven Synthesis in Controller-Datapath Systems," in *IEEE Trans. VLSI Systems,* vol. 2, pp. 68–80, March 1994 and S. Bhattacharya, S. Dey, and F. Brglez, "Clock Period Optimization During Resource Sharing and Assignment," in *Proc. Design Automation Conf.,* pp. 195–200, June 1994 that if two operations $op_1$ and $op_2$, belonging to two mutually exclusive paths in a state, share the same functional unit, the value of the conditional $C_{lca}$, which is the least common ancestor to the two operations (the first conditional common to the two paths), is needed to decide which operation will be executed on the functional unit in a given clock cycle.

Therefore, chaining is introduced from the comparator that performs $c_{lca}$ to the functional unit that performs $op_1$ and $op_2$. Similarly, if two idle sub-states Si1 and Si2 within a state Si are assigned distinct labels Li1 and Li2, the decision of whether the data path component under consideration will perform the computation corresponding to Li1 or Li2 will depend upon the least common ancestor of Si1 and Si2.

Therefore, the expressions for the re-specified control signals will contain the output of the comparator implementing the conditional, leading to chaining from the comparator to the data path component under consideration. The long path thus formed in the RTL circuit may cause an increase in the circuit delay due to controller re-specification.

Consider again the part of the Dealer RTL circuit and the activity graph for the ALU shown in FIG. 5. For ease of illustration, a simplified version of the activity graph is used that is shown in FIG. 10(a), where the three sub-states that belong to state 10S5 have been grouped together, and the corresponding sub-state transitions have been grouped together into transitions to/from 10S5. The control-flow skeleton within state 10S5 that indicates the conditional paths that the sub-states correspond to, is also shown in dotted lines.

If the two idle sub-states 10S5.$\overline{c1}$.c2 and 10S5.$\overline{c1}.\overline{c2}$ are labeled differently, say Card+1 and Deckside—Seed, then to choose between the two operands, the result of the conditional (<) shown in state S5 is required. Consequently, re-specified control signals like Sel (10) (see FIG. 5(b)) will depend upon the corresponding (<) comparator, thereby creating a path in the RTL circuit that consists of the (<) comparator, the logic that generates Sel (10), the multiplexer network that feeds the ALU, and the ALU itself. One of the constraints imposed while generating the schedule of FIG. 5(a) was precisely that such a chaining be avoided since it increases the circuit delay (clock period) significantly.

While introducing long paths is undesirable due to controller re-specification if they lead to a violation of the intended circuit clock period (or delay constraint), exploiting the slack available at some of the off-critical-path control signals to label sub-states differently may be possible. For the sub-states in each state of the activity graph, whether labeling the sub-states differently leads to negative slack at any of the control signals that get re-specified as a result of the labeling needs to be detected. The slack for each control signal is calculated by using a specified delay constraint at the primary outputs and flip-flop inputs. For instance, in the previous example, labeling substates 10S5.$\overline{c1}$.c2 and 10S5.$\overline{c1}.\overline{c2}$ differently would lead to the chaining of the (<) comparator with the ALU, creating a negative slack at control signal Sel(10). To ensure that such sub-states are not labeled differently by the activity graph re-labeling procedure, the sub-states are merged into a single vertex in the activity graph. This ensures that the circuit delay constraint will not be violated because of labeling the two sub-states differently. For instance, the two sub-states 10S5.$\overline{c1}$.c2 and 10S5.$\overline{c1}.\overline{c2}$ are merged into a single sub-state 10S5.$\overline{c1}$, as shown in FIG. 10(b).

A pre-processing procedure, applied before attempting to re-label the activity graph of a data path component, examines the sub-states of each state by estimating the delay resulting from labeling the sub-states differently. This is done by using the high-level delay estimation tool FEST S. Bhattacharya, S. Dey, and F. Brglez, "Provably correct high-level timing analysis without path sensitization," in *Proc. Int. Conf. Computer-Aided Design*, pp. 736–742, November 1994. If the labeling leads to negative slack at the control signals, the sub-states are merged. Note that in the actual activity graph, execution frequencies or probabilities and activity matrices are required for each transition involving sub-states, and not just transitions involving states. Transitions between sub-states were not explicitly indicated in the activity graphs of FIGS. 10(*a*) and 10(*b*) for ease of illustration. FIG. 10(*c*) shows the actual activity graph for the ALU after merging sub-states, that has explicit arcs for transitions between sub-states, and their execution counts.

IV G. False Combinational Loops Due to Controller Re-specification

While conventional understanding of combinational circuits assumes that such circuits have an acyclic topology, it is known that circuits with cyclic structure can be combinational. See W. H. Kautz, "The Necessity of Closed Loops in Minimal Combinational Circuits," in *IEEE Trans. Computers*, pp. 162–164, February 1970 and S. Malik, "Analysis of cyclic combinational circuits," in *IEEE Trans. Computer-Aided Design*, vol. 13, pp. 950–956, July 1994. In the context of high-level synthesis, it was shown in L. Stok, "False loops through resource sharing," in *Proc. Int. Conf. Computer-Aided Design*, pp. 345–348, November 1992 that indiscriminate resource sharing can lead to the formation of false combinational loops in the synthesized RTL circuit.

Resource sharing techniques to avoid the formation of such combinational loops were also presented in L. Stok, "False loops through resource sharing," in *Proc. Int. Conf. Computer-Aided Design*, pp. 345–348, November 1992. This section demonstrates that controller re-specification in the presence of mutually exclusive conditional paths within each controller state can also lead to the formation of false combinational cycles in the RTL circuit.

Consider the scheduled (functional RTL) description shown in FIG. 11(*a*), that is implemented using one adder and one (<) comparator by the RTL circuit shown in FIG. 11(*b*). Note that there is data chaining from the output of the adder to the input of the (<) comparator. Also note that, initially, the logic expressions for the select inputs of the various multiplexers feeding the adder do not depend on comparator output c2. Hence, the connection shown by the dotted line does not exist in the original RTL circuit.

Consider applying the controller re-specification technique to minimize unnecessary activity in the adder. The partial activity graph for the adder is shown in FIG. 11(*c*), along with the labeling that minimizes activity at the adder's inputs. Note that the labels assigned to sub-states 11S1.c2 and 11S1.$\overline{c2}$ are different.

From earlier discussions it is clear that labeling the different sub-states, that constitute a state, differently can introduce a dependency from the outputs of one or more comparators in the data path to the sub-circuit whose activity graph is being re-labeled. In the example of FIG. 11, the control expressions for the select inputs of the multiplexer trees feeding the adder will now depend on c2, introducing a combinational dependency as shown by the dotted line in FIG. 11(*b*), and therefore, a combinational cycle in the RTL circuit. The above combinational cycle is false because its various segments are never activated simultaneously, i.e., in any given cycle, either the comparator uses the adder output, or the adder uses the comparator output, but not both.

While researchers have proposed techniques to handle cyclic combinational circuits during logic synthesis, such capabilities are not typical in current commercial and in-house production tools. So, avoiding the formation of combinational cycles in the RTL circuit may frequently be necessary.

The controller re-specification procedure is improved according to an aspect of this invention to ensure that controller re-specification does not introduce false combinational cycles by merging appropriate sub-states in the activity graph.

For each pair of sub-states in each state in the activity graph, one or both of which are idle, the additional dependencies from comparator outputs, that are introduced if the two sub-states were to be labeled differently, are determined. If such a dependency exists, a linear-time traversal of the RTL circuit structure is performed in order to determine if a combinational cycle was introduced by the added dependency. If the traversal detects a cycle, the pair of sub-states is merged into a single vertex in the activity graph. Such merging effectively ensures that both the sub-states are labeled identically, avoiding the introduction of any cycle forming dependencies. Revisiting the example in FIG. 11, it can be seen that re-labeling substates 11S1.c2 and 11S1.$\overline{c2}$ differently introduces a combinational cycle. Therefore, sub-states 11S1.c2 and 11S1.$\overline{c2}$ are merged into a single vertex, 11S1, effectively forcing the label i+1 to be used for idle sub-state 11S1.$\overline{c2}$.

IV H. The Power Management Algorithm

This section describes an algorithm to perform power management through controller re-specification techniques. The terminology used for the rest of this section is first introduced.

An RTL circuit consists of an interconnection of RTL circuit nodes, which could be either RTL units (functional units, registers, or comparators), and interconnect units, i.e., multiplexer networks. Arbitrary functional units, which are not restricted to arithmetic operations alone, are supported.

An RTL block refers to an RTL unit, grouped together with the multiplexer network(s) feeding it. An RTL block can have control inputs (e.g. select signals for multiplexers, select function signals for ALUs), as well as data inputs.

Distinguishing between control inputs and data inputs is necessary since the aim is to re-specify the control logic that feeds the control inputs of various RT1 blocks. In general, control signals can depend on the present state of the controller as well as on outputs of other RTL blocks (e.g., outputs of comparators).

A data (control) dependency is said to exist between two RTL blocks $B_1$ and $B_2$ when an output of $B_1$ feeds a data (control) input of $B_2$.

A data dependence graph (control dependence graph) is a directed acyclic graph where vertices represent RTL blocks, and edges represent data (control) dependencies. The data and control dependence graphs are acyclic although the RTL circuit graph may be cyclic, since outgoing arcs from RTL blocks that correspond to data path registers are not included.

If a combinational path from the output of RTL block $B_i$ to a data input of block $B_j$ exists, re-specifying control signals for block $B_i$ before block $B_j$ is desirable. This is because a re-specification of the control signals feeding block $B_i$ affects the values appearing at its outputs, and so the entries in the activity matrices of the activity graphs for block $B_j$.

On the other hand, if a path from the output of block $B_i$ to a control input of block $B_j$ exists, processing block $B_j$ first is desirable so that the final logic expressions for the control signals that feed $B_j$ are available while applying the power management technique to block $B_i$, as explained in earlier.

An activity graph is a vertex-labeled, arc-weighted, directed graph AG=(V, A). The vertices of the activity graph represent the states and sub-states of the controller.

Each arc $v_i \rightarrow v_j$ has associated with it (i) a weight $W_{vi \rightarrow vj}$ that represents the execution frequency or probability of the corresponding state or sub-state transition, and (ii) an activity matrix $AM_{vi \rightarrow vj}$ that stores the costs associated with the arc for various combinations of labels that can be assigned to $v_i$ and $v_j$.

A set of idle vertices $I \subset V$ is given such that changing the label of any of the vertices in I does not affect the functionality of the design. To perform such a re-labeling, associating some measure of the cost of assigning each possible label to an idle vertex in the activity graph is necessary. For the experiments, the entries in the activity matrices were obtained through RTL cycle-based simulation.

The control signal re-specification problem is logically equivalent to a minimum cost vertex labeling problem (MCVLP) on the activity graph. The aim is to assign exactly one label from a set of k labels $L=L_1, \ldots, L_k$ to each vertex in the idle set I. The cost of an assignment is measured as described earlier. MCVLP can be shown to be NP-Hard. Therefore, a heuristic is used to solve this problem that is described later in this section.

A preferred embodiment of the power management algorithm of the present invention is described in the pseudocode shown in FIG. 12. The data path is first broken up into its constituent RTL blocks (procedure IDENTIFY_RTL BLOCKS). Then, the data (control) dependence graph is created by calling procedure CREATE_DATA_ DEPENDENCE_GRAPH . The data and control dependence graphs are used to derive the order in which to visit RTL blocks in the data path for re-specifying their control signals.

At each RTL block, the algorithm first attempts to re-label the activity graph of its RTL unit. This is done by the call to procedure RESPEC_CONTROL_SIGNALS, that performs the actual control signal re-specification for a given SUP. Then, this procedure is called once for each multiplexer network in the RTL block, passing to it as a parameter the root of the appropriate multiplexer network in each case.

When a multiplexer is passed to it as a parameter, RESPEC_CONTROL_SIGNALS recursively traverses the multiplexer network, attempting to minimize activity at the output of the current multiplexer at each step.

Procedure RESPEC_CONTROL_SIGNALS is described next. First, it calls procedure CREATE_ ACTIVITY_GRAPH to create an activity graph for the RTL unit or multiplexer output signal under consideration.

Procedure MERGE_SUBSTATES is used to ensure that no relabeling of the idle activity graph vertices can introduce a long path that leads to an increase in circuit delay or lead to the formation of a false combinational cycle as described in earlier sections. It is still possible that the delay of the circuit may increase due to a few additional levels of gates in the re-specified control logic. However, in practice, it is found that such effects contribute to very nominal overheads in delay, if any, as demonstrated by the experimental results that follow.

A simple heuristic procedure MIN_COST_LABELING is used to solve MCVLP on the activity graph. The procedure iterates over the unlabeled vertices of the activity graph, labeling the unlabeled vertex picked at each step so that the incremental cost of the labeling is minimized.

The order in which unlabeled vertices are visited during the procedure has a significant impact on the final labeling. An unlabeled vertex V* is chosen to visit next, such that the quantity Labeled_Vertex_Arcs(V*) given by the following equation is maximum.

$$\text{Labeled\_Vertex\_Arcs}(V^*) = \sum_{\text{all } Vi \rightarrow V^* \text{ s.t. } V_i \text{ is labeled}} W_{Vi \rightarrow V^*} + \sum_{\text{all } V^* \rightarrow Vj \text{ s.t. } V_j \text{ is labeled}} W_{V^* \rightarrow Vj}$$

The rationale behind the criterion is that knowledge of the labels assigned to neighboring vertices is essential to compute the cost of assigning a label to the picked vertex accurately. Having picked vertex V* to label next, a greedy approach is used to assign a label to it. A label $L^* \epsilon L$ is selected such that the quantity Incr_labeling_Cost(V*,L*) given by the equation below is minimized.

$$\text{Incrl\_Labeling Cost}(V^*, L^*) = \sum_{\text{all } Vi \rightarrow V^* \text{ s.t. } V_i \text{ is labeled}} AM_{Vi \rightarrow V^*}[L_i, L^*] \cdot W_{Vi \rightarrow V^*} + \sum_{\text{all } V^* \rightarrow Vj \text{ s.t. } V_j \text{ is labeled}} AM_{V^* \rightarrow Vj}[L^*, L_j] \cdot W_{V \rightarrow Vj}$$

As illustrated in earlier, it is possible that re-specifying a control signal can lead to glitches being generated at one of the re-specified control signals or at other data and/or control signals. In order to account for the effects of glitching at data inputs to multiplexer networks, the procedure identifies, for each idle sub-state in the activity graph, the glitching activity at each data input to the multiplexer network feeding the SUP.

The RTL switching activity estimation techniques presented in A. Raghunathan, S. Dey, and N. K. Jha, "Register-Transfer Level Estimation Techniques for Switching Activity and Power Consumption," in *Proc. Int. Conf. Computer-Aided Design,* pp. 158–165, November 1996 are used for this purpose.

All data inputs, whose glitching activity is greater than a user-specified threshold, are identified as glitchy. The re-specification algorithm of the preferred embodiment attempts to eliminate/minimize the propagation of glitching activity from data signals as follows.

While selecting a label for an idle state, the procedure first attempts to choose a label that does not involve a glitchy data input. If such a label does not exist, the glitchy data inputs are sorted in increasing order of their glitching activity in the idle sub-states, and a label is chosen in that order of priority.

Procedure SELECTIVELY_UNDO_LABELS_FOR_ GLITCHING is called in order to account for glitching activity at the re-specified control signals as well as other control signals in the transitive fanout of the SUP. The procedure first uses the switching activity estimator to estimate glitching activities for the control expressions of the re-specified control signals, as well as all other control signals in the transitive fanout of the SUP.

For control signals that show a significant increase in glitching activity, information is collected about which substates the control signals are glitchy in, and whether the increase in glitching activity is primarily due to glitch generation in the control logic, or due to glitch propagation through the control logic, or both.

Distinguishing between glitch generation in and propagation through the control logic is necessary for the following reason. To avoid an increase in glitching activity at a control signal in sub-state Si1 due to glitch generation, undoing the activity graph re-labeling may be necessary, in general, if any, in Si1 and all sub-states that have transitions into or from Si1. On the other hand, to avoid an increase in glitch propagation in Si1, undoing the re-labeling in Si1 itself is sufficient. After undoing some of the labels in the activity graph, procedure MIN_COST_LABELING is iterated to select alternative labels for sub-states whose labels are undone.

IV I. System for Controller Re-specification

FIG. 13 shows a preferred embodiment of a system that performs controller re-specification according to the present invention. It consists of a circuit input unit 1310, an RTL circuit structure analyzer 1330, a controller redesign unit 1320 and a circuit output unit 1340. The circuit input unit 1310 receives a sequential circuit, the RTL circuit structure 1330 analyzer analyzes the received circuit for controller re-specification and the controller redesign unit 1320 redesigns the circuit using controller re-specification by changing the control logic to reduce power consumption. Finally the redesigned circuit is output by the output unit 1340.

FIG. 14 shows further improvements where the redesign unit comprises an RTL unit enumerator 1410, an activity graph generator 1420, an activity graph relabeler 1430 and a controller logic reflector 1440. The RTL unit enumerator 1410 enumerates RTL units in the received circuits. The activity graph regenerator 1420 generates an activity graph of the RTL units and the activity graph relabeler 1430 relabels the activity graph. Control logic reflector modifies the control logic according to the relabeled activity graph.

FIG. 15 shows further improvement where the RTL circuit structural analyzer comprises an RTL block identifier 1510, a data dependency graph extractor 1520, a control dependency graph extractor 1530 and an RTL block sorter 1540. The RTL block identifier 1510 identifies RTL blocks in the received circuit. The data dependency graph extractor 1520 extracts a data dependency graph of the received circuit. The control dependency graph extractor 1530 extracts a control dependency graph of the received circuit and the RTL block sorter 1540 orders the identified RTL blocks using information from the data dependency graph and the control dependency graph.

FIG. 16 shows improvements where the controller redesign unit further comprises a delay estimator 1660, a combinational loop checker 1670 and a switching activity estimator 1640. The delay estimator 1660 estimates delays introduced in a redesigned circuit. The combinational loop checker 1670 identifies combinational loops in the redesigned circuit, and the switching activity estimator 1640 estimates all the switching activity in the redesigned circuit.

IVJ. Flowcharts for Preferred Embodiments of Methods According to the Present Invention FIG. 17 depicts a flowchart representing an embodiment of a method for changing control logic for a sequential circuit to reduce power consumption. In step 1710 a sequential circuit is input. An activity graph of the sequential circuit is created in 1720. Idle states in the sequential circuit are identified in 1730. These idle states are relabeled in 1740. After relabelling the idle states the control logic of the sequential circuit is redesigned in 1750 and the redesigned circuit is output in 1760.

FIG. 18 shows a flowchart representing an embodiment of a method to modify an activity graph to account for nested conditionals according to the present invention. A state in the sequential circuit that has not yet been processed is selected in 1820. In step 1830 the algorithm determines if the state has any nested conditionals. If it has no nested conditionals the algorithm proceeds to step 1860. If the selected state has nested conditionals then the state is split into substates in step 1840. A vertex is created for each such substate in 1850 and the algorithm proceeds to 1860. If there are more steps to be processed the algorithm returns to step 1830 and continues.

FIG. 19 shows a flowchart representing an embodiment of a method to modify an activity graph to account for nested conditionals according to the present invention. After relabelling states in step 1740, a state or a substate that has not been processed by this algorithm is selected in 1910. In 1910 occurrence of glitch in the selected state is determined. If no glitch occurs the algorithm proceeds to step 1940. If glitches occur the relabelling of the state or substate is rejected in 1930. If there are more states and substates to be processed the algorithm loops back to 1920 from 1940.

FIG. 20 shows a flowchart representing an embodiment of a method to modify an activity graph to account for increase in delay. In 2010, whether an increase in delay occurs is determined. In 2020 the substates in which delays are increased are merged.

FIG. 21 shows a flowchart representing an embodiment of a method to modify an activity graph to account for additional dependencies and combinational cycles. In 2110 a new pair of substate within a state is identified where one member of the pair is idle. In step 2130, a determination is made whether additional dependencies are introduced if the pairs are relabeled. If not, the algorithm proceeds to 2160. If additional dependencies exist, a linear time traversal of the circuit is made in step 2130. In step 2140 whether combinational cycles are introduced is determined. If combinational cycles are introduced the pair is merged in step 2150. If not, the algorithm proceeds to step 2160, where it loops back to 2110 if more pairs exist.

FIG. 22 shows a flowchart representing a preferred embodiment of a method of power management through controller re-specification. In step 2210 a sequential circuit is input. In step 2220, the circuit is broken down into RTL blocks. In 2230 one or more dependency graphs for the circuit are created. In step 2240 the order of visiting RTL blocks is created. In 2250 an RTL block that has not yet been selected is selected. In 2260 each multiplexor tree that feeds the selected RTL block is selected. In 2270 the algorithm loops back to 2250 if RTL blocks remain that are yet to be re-specified according to this algorithm.

FIG. 23 shows a flowchart representing a preferred embodiment of a method of re-specification according to the present invention. In step 2310 an activity graph is created. In 2320 substates are merged. In 2330 data inputs that are glitchy are identified. In 2340 a minimum cost labelling is performed. In 2350 glitchy labels are unlabelled. In 2360 the algorithm loops back to 2340 if more unlabelled vertices exist. In 2370 the algorithm recursively performs this re-specification algorithm for the left multiplexor tree and then the right multiplexor tree.

FIG. 24 shows a flowchart representing a preferred embodiment of a method for merging substates according to the present invention. In 2410 a state is selected that has not yet been processed. In step 2420 a pair of substates within the selected state is selected that has not yet been processed. In 2430 whether the pair of substates are idle is determined. If they are, then the algorithm proceeds to 2470 where it loops back to 2420 for identifying more substates. If the pair of substates are not idle, then in step 2440, cycles are identified. If there are cycles then the algorithm proceeds to step 2460 to merge substates. If not then a determination is made in step 2450 if estimated delay is greater than the cycle period. If delays are greater then the algorithm proceeds to step 2460 to merge such substates. Finally in step 2470 and 2480 the algorithm loops back to process more pairs of substates and more states.

FIG. 25 shows a flowchart representing a method of applying minimum cost labelling. In step 2510 the next unlabelled vertex is selected. In step 2520 the vertex is labelled so that incremental cost is minimized. In 2530 the algorithm loops to process more vertices.

IV K. Experimental Results

This section presents results of the application of a preferred embodiment of the controller-based power management technique of the present invention to the following RTL circuits implementing typical control-flow-intensive specifications. A barcode reader and a dealer, that is a process that acts as a dealer for the BlackJack card game are used. See S. Bhattacharya, S. Dey, and F. Brglez, "Clock Period Optimization During Resource Sharing and Assignment," in *Proc. Design Automation Conf.*, pp. 195–200, June 1994.

GCD is an implementation of the greatest common divisor, PixelGen is a line-drawing process that is part of a graphics controller. See A. Raghunathan, S. Dey, N. K. Jha, and K. Wakabayashi, "Controller Re-Specification To Minimize Switching Activity in Controller/Data Path Circuits," in *Proc. Int. Symp. Low-Power Electronics and Design*, pp. 301–306, August 1996.

X.25 is a simplified version of the send process of the X.25 communications protocol. See Bhattacharya, S. Dey, and F. Brglez, "Performance analysis and optimization of schedules for conditional and loop-intensive specifications," in *Proc. Design Automation Conf.*, pp. 491–496, June 1994.

These specifications are characterized by the presence of nested loops and conditionals, and array accesses in the behavioral descriptions, apart from arithmetic and comparison operations. The initial RTL circuits were obtained by synthesizing VHDL behavioral descriptions using a popular behavioral system. See S. Bhattacharya, S. Dey, and F. Brglez, "Clock Period Optimization During Resource Sharing and Assignment," in *Proc. Design Automation Conf.*, pp. 195–200, June 1994 and S. Bhattacharya, S. Dey, and F. Brglez, "Performance analysis and optimization of schedules for conditional and loop-intensive specifications," in *Proc. Design Automation Conf.*, pp. 491–496, June 1994.

Note that only the controller is modified as a result of application of the presented power management techniques, while the data path is not modified. The initial and controller re-specified RTL circuits were optimized similarly. See CMOS6 Library Manual. NEC Electronics, Inc., December 1992.

These mapped netlists were used to measure area, delay, and power consumption.

Table 1 presents the power savings obtained, and area and delay overheads incurred, by the present controller-based Power management technique (COP). The labels Original and COP refer to the RTL circuits before application of power management, and after applying our power management techniques while attempting to avoid their negative effects on delay and glitching activity. The columns Power, Area, Delay, and Power Red. provide the power consumption (in milliwatts), area (cell grid count+wiring area estimate), delay (clock period in nanoseconds), and power reductions after mapping to the technology library used. A simulation-based power estimation tool was used to measure power consumption. The vectors used for simulation were obtained as follows. For each design, the behavioral test bench, containing typical stimuli that were derived based on a knowledge of the design's functionality and intended environment, was used.

A simulator was used to obtain a cycle-by-cycle input vector trace. The above step is specially important for control-flow intensive designs where, unlike data-flow intensive designs, the number of clock cycles required to perform the computation varies depending on the input values. The cycle-by-cycle input vector trace was used for evaluating the initial and optimized designs for power consumption. The results indicate that controller-based power management results in significant savings in power consumption (up to 52%) for control-flow intensive RTL designs, with nominal overheads in area and delay.

TABLE 1

Experimental results: Power savings obtained through controller-based power management

| Circuit | Version | Power (Mw) | Area | Delay (ns) | Power Red. |
|---------|---------|------------|------|------------|------------|
| Barcode | Original | 3.12 | 2004 | 49.4 | 13.1% |
|         | COP     | 2.71 | 1998 | 46.7 |       |
| Dealer  | Original | 8.58 | 7921 | 128.8 | 28.0% |
|         | COP     | 6.18 | 7949 | 128.6 |       |
| GCD     | Original | 1.79 | 1326 | 48.8 | 15.6% |
|         | COP     | 1.51 | 1334 | 49.8 |       |
| PixelGen | Original | 9.65 | 3871 | 132.9 | 32.8% |
|         | COP     | 6.48 | 3906 | 131.4 |       |
| X.25    | Original | 4.50 | 2099 | 44.4 | 51.8% |
|         | COP     | 2.17 | 2102 | 49.6 |       |

To illustrate the importance of considering the negative effects of re-specification on delay and glitching activity, another set of experiments was performed. The controllers of the RTL circuits were redesigned without considering the side effects of the re-specification on circuit delay and on glitching activities at signals in the RTL circuit (COP w/o side effects). These results were compared with COP and are presented in Table 2. These results illustrate that ignoring the negative effects of power management on circuit delay and glitching power consumption leads to a significant increase (up to 76%) in circuit delay, and power savings being offset by an increase in glitching power consumption.

TABLE 2

Experimental results: Avoiding the negative effects of power management

| Circuit | Version | Power | Area (Mw) | Delay (ns) | Power Red. |
|---------|---------|-------|-----------|------------|------------|
| Barcode | COP w/o side effects | 2.84 | 2016 | 47.6 | 9.0% |
|         | COP | 2.71 | 1998 | 46.7 | 13.1% |
| Dealer  | COP w/o side effects | 8.04 | 7997 | 166.1 | 6.3% |
|         | COP | 6.18 | 7949 | 128.6 | 28.0% |
| GCD     | COP w/o side effects | 1.70 | 1328 | 85.7 | 5.0% |
|         | COP | 1.51 | 1334 | 49.8 | 15.6% |
| PixelGen | COP w/o side effects | 9.19 | 3941 | 159.6 | 4.8% |
|         | COP | 6.48 | 3906 | 131.4 | 32.8% |
| X.25    | COP w/o side effects | 2.91 | 2124 | 50.1 | 35.3% |
|         | COP | 2.17 | 2102 | 49.6 | 51.8% |

Other modifications and variations to the invention will be apparent to those skilled in the art from the foregoing disclosure and teachings. Thus, while only certain embodiments of the invention have been specifically described herein, many modifications may apparently be made thereto without departing from the spirit and scope of the invention.

What is claimed is:

1. A controller based power management system for a sequential circuit comprising:

a circuit input unit;

a register transfer level (RTL) circuit structure analyzer;

a controller redesign unit; and a circuit output unit, wherein said circuit input unit receives a design of a sequential circuit, wherein said RTL circuit structure analyzer analyzes the design of the sequential circuit for controller re-specification, wherein said controller redesign unit redesigns the sequential circuit using controller re-specification by changing only a control logic of the sequential circuit to reduce power consumption, wherein said output unit outputs a redesigned sequential circuit.

2. A controller based power management system according to claim 1 wherein said controller redesign unit comprises:

an RTL unit enumerator;

an activity graph generator;

an activity graph relabeler; and a controller logic reflector, wherein said RTL unit enumerator enumerates RTL units in the sequential circuit, wherein said activity graph generator generates activity graphs of the RTL units, wherein said activity graph relabeler relabels the activity graphs.

3. A controller based power management system according to claim 1 wherein said RTL circuit structural analyzer comprises:

an RTL block identifier;

a data dependency graph extractor;

a control dependency graph extractor; and an RTL block sorter, wherein said RTL block identifier identifies RTL blocks in the sequential circuit, wherein said data dependency graph extractor extracts a data dependency graph of the sequential circuit, wherein said control dependency graph extractor extracts a control dependency graph of the sequential circuit and wherein said RTL block sorter sorts the RTL blocks.

4. A controller based power management system according to claim 1 wherein said controller redesign unit further comprises:

a delay estimator;

a combinational loop checker; and a switching activity estimator, wherein said delay estimator estimates delays introduced in the redesigned sequential circuit, wherein said combinational loop checker identifies combinational loops in the redesigned sequential circuit, and wherein said switching activity estimator estimates all the switching activity in the redesigned sequential circuit.

5. A method for changing control logic of a sequential circuit to reduce power consumption wherein said method comprises:

(a) receiving a design of said sequential circuit; and (b) redesigning said sequential circuit such that said redesigning does not affect data logic of said sequential circuit apart from reducing power in the data logic of the sequential circuit.

6. A method for changing control logic for a sequential circuit to reduce power consumption, said method comprising:

(a) creating activity graph of the sequential circuit;

(b) identifying idle states in the activity graph;

(c) changing control logic by relabeling the idle states to form relabeled idle states; and (d) redesigning control logic using the relabelled idle states.

7. A method according to claim 6 wherein step (a) further comprises:

(a)(1) identifying states with nested conditional operations;

(a)(2) splitting said states into a plurality of substates wherein each said plurality of substates corresponds to a mutually exclusive conditional path; and (a)(3) creating a vertex in the activity graph for each of said plurality of substates.

8. A method according to claim 6 wherein step (c) further comprises:

(c)(1) relabeling states and substates;

(c)(2) identifying a subset of the states and a subset of the substates where glitches occur; and (c)(3) rejecting relabeling for the subset of the states and the subset of the substates identified in step (c)(2).

9. A method according to claim 8 wherein step (c) further comprises:

(c)(4) identifying substates which if labeled differently lead to increase in delay at re-specified control signals; and (c)(5) merging substates identified in (c)(4) into a single vertex.

10. A method according to claim 9 wherein a high level delay estimation tool is used to estimate negative slacks.

11. A method according to claim 6 wherein transitive fan-outs to a circuit component in the sequential circuit are identified and re-specified prior to re-specifying said circuit component.

12. A method according to claim 6 wherein said states and their corresponding substates whose arithmetic logic unit output are known to be glitchy are not selected for relabelling.

13. A method according claim 6 wherein step (c) further comprises:

(c)(6) identifying pairs of substates corresponding to each of said states wherein at least one member of said pairs is idle;

(c)(7) identifying additional dependencies that are introduced if said pairs of substates are relabeled;

(c)(8) performing a linear time traversal of the circuit;

(c)(9) determining if a combinational cycle is introduced; and (c)(10) merging each of said pairs of substates into a single vertex in the activity graph if a combinational cycle is introduced.

14. A method of managing power in a sequential circuit using control re-specification, said method comprising:

(a) breaking a data path of a sequential circuit into register transfer level (RTL) blocks;

(b) creating one or more dependency graphs;

(c) changing order in which to select said RTL blocks for re-specification to create an ordered list using the one or more dependency graphs;

(d) selecting next unrespecified RTL unit in the ordered list;

(e) re-specifying each multiplexor tree feeding the RTL unit selected in step (d); and (f) repeating steps (d) through (e) for all RTL units in the ordered list.

15. A method according to claim 14 wherein one of said dependency graphs is a data dependency graph.

16. A method according to claim 14 wherein one of said dependency graph is a control dependency graph.

17. A method of claim 14 wherein said re-specifying in step (e) is performed using the steps of:

(e)(1) creating activity graph;

(e)(2) merging substrates in said activity graph;

(e)(3) marking glitchy data inputs;

(e)(4) applying minimum cost labeling to said activity graph;

(e)(5) undoing labeling for said glitchy labels in said activity graph;

(e)(6) repeating steps (e)(4)–(e)(5) for all unlabeled vertices;

(e)(7) recursively re-specifying a left predecessor multiplexor tree; and (e)(8) recursively re-specifying a right predecessor multiplexer tree.

18. A method according to claim 17 wherein merging substates in step (e)(2) comprises:

(e)(2)(i) selecting a state;

(e)(2)(ii) identifying a pair of substates for said state;

(e)(2)(iii) determining if at least one substate from said pair of substates is idle;

(e)(2)(iv) merging said substates if step (e)(2)(iii) is true and if cycles are detected;

(e)(2)(v) merging said substates if step (e)(2)(iii) is true and if estimated delay is greater than cycle period;

(e)(2)(vi) repeating steps (e)(2)(ii) through (e)(2)(v) for all pairs of substates for said state; and (e)(2)(vii) repeating (e)(2)(i) through (e)(2)(vi) for all states.

19. A method according to claim 17 wherein step (e)(4) comprises:

(e)(4)(i) identifying next unlabeled vertex in the activity graph according to a preselected criteria;

(e)(4)(ii) labeling unlabeled vertices so that incremental cost is minimized; and (e)(4)(iii) repeating step (e)(4)(ii) for each unlabeled vertex.

20. A method according to claim 19 wherein step (e)(4)(i) comprises:

selecting an unlabelled vertex $V^*$;

identifying all transitions from all labeled vertices $V_i$ to $V^*$;

assigning a cost of transition each to each of said vertices identified in the previous step;

adding assigned costs in the previous step to form a first sum;

identifying all transitions from $V^*$ to all labelled vertices $V_j$;

assigning a cost of transition each from each of said vertices identified in the previous step;

adding assigned costs in the previous step to form a second sum;

adding the first and the second sum to form the labelled vertex quantity;

repeating all the previous steps for all unlabeled vertices; and selecting the vertex with maximum labelled vertex quantity.

21. A method according to claim 19 where the incremental cost in step (e)(4)(ii) is calculated using the formula:

$$\text{Incrl\_Labeling Cost}(V^*, L^*) = \sum_{\text{all } V_i \to V^* \text{ s.t. } V_i \text{ is labeled}} AM_{V_i \to V^*}[L_i, L^*] \cdot W_{V_i \to V^*} + \sum_{\text{all } V^* \to V_j \text{ s.t. } V_j \text{ is labeled}} AM_{V^* \to V_j}[L^*, L_j] \cdot W_{V^* \to V_j}$$

where, $L_i$ and $L_j$ are labels,

AM is an activity matrix, and

W is one of a probability and count of the transitions between the corresponding substates.

22. A computer program product for a controller based power management system for a sequential circuit comprising a circuit input unit, a register transfer level (RTL) circuit structure analyzer, a controller redesign unit, and a circuit output unit, the computer program product including a computer readable medium comprising:

a circuit input unit code;

an RTL circuit structure analyzer code;

a controller redesign unit code; and a circuit output unit code, wherein said circuit input unit code enables a computer to receive a design of the sequential circuit, wherein said RTL circuit structure analyzer code enables a computer to analyze the design of the sequential circuit for controller re-specification, wherein said controller redesign unit code enables a computer to redesign the sequential circuit using controller re-specification by changing only the control logic to reduce power consumption, wherein said sequential circuit output unit code outputs a redesigned circuit.

23. A computer program product according to claim 22 wherein said controller redesign unit code comprises:

an RTL unit enumerator code;

an activity graph generator code;

an activity graph relabeler code; and a controller logic reflector code, wherein said RTL unit enumerator code enables a computer to enumerates RTL units in the sequential circuit, wherein said activity graph generator code enables a computer to generate an activity graph of the RTL units, wherein said activity graph relabeler code enables a computer to relabel the activity graph.

24. A computer program product according to claim 22 wherein said RTL circuit structural analyzer code comprises:

an RTL block identifier code;

a data dependency graph extractor code;

a control dependency graph extractor code; and an RTL block sorter code,
wherein said RTL block identifier code enables a computer to identify RTL blocks in the sequential circuit,
wherein said data dependency graph extractor code enables a computer to extract a data dependency graph of the sequential circuit,
wherein said control dependency graph extractor code enables a computer to extract a control dependency graph of the sequential circuit and
wherein said RTL block sorter code enables a computer to sort the RTL blocks.

25. A computer program product according to claim 22 wherein said controller redesign unit code further comprises:

a delay estimator code;
a combinational loop checker code; and
a switching activity estimator code,
wherein said delay estimator code enables a computer to estimates delays introduced in a redesigned circuit,
wherein said combinational loop checker code enables a computer to identify combinational loops in the redesigned circuit, and
wherein said switching activity estimator code enables a computer to estimate all the switching activity in the redesigned circuit.

\* \* \* \* \*